(12) United States Patent
Han

(10) Patent No.: US 7,985,156 B2
(45) Date of Patent: Jul. 26, 2011

(54) MECHANICALLY CONTROLLED CONTINUOUSLY VARIABLE AUTOMATIC TRANSMISSION

(75) Inventor: Wenming Han, Beijing (CN)

(73) Assignee: Beijing Wujitong Automotive Systems Technology Co., Ltd., Beijing (CN)

( * ) Notice: Subject to any disclaimer, the term of this patent is extended or adjusted under 35 U.S.C. 154(b) by 743 days.

(21) Appl. No.: 11/666,390

(22) PCT Filed: Oct. 29, 2004

(86) PCT No.: PCT/CN2004/001239
§ 371 (c)(1),
(2), (4) Date: May 13, 2008

(87) PCT Pub. No.: WO2006/045224
PCT Pub. Date: May 4, 2006

(65) Prior Publication Data
US 2008/0287241 A1 Nov. 20, 2008

(51) Int. Cl.
*F16H 1/32* (2006.01)
(52) U.S. Cl. ........................ 475/162; 475/255
(58) Field of Classification Search .................. 475/181, 475/255
See application file for complete search history.

(56) References Cited

U.S. PATENT DOCUMENTS

| | | | |
|---|---|---|---|
| 2,667,794 A | 2/1954 | McGill | |
| 3,728,911 A * | 4/1973 | Granville | 475/255 |
| 4,889,013 A | 12/1989 | Pitassi | |
| 4,907,474 A | 3/1990 | Bolger | |
| 5,080,636 A * | 1/1992 | Weber | 475/14 |
| 5,617,747 A | 4/1997 | Kim | |
| 5,860,321 A | 1/1999 | Williams et al. | |
| 6,044,718 A | 4/2000 | Lester | |
| 6,062,096 A | 5/2000 | Lester | |

FOREIGN PATENT DOCUMENTS

| | | |
|---|---|---|
| CN | 1219987 | 6/1999 |
| CN | 2604565 | 2/2004 |
| CN | 1499106 | 5/2007 |
| GB | 135827 | 1/1920 |
| JP | 56076729 | 6/1981 |
| JP | 02146359 | 6/1990 |

\* cited by examiner

*Primary Examiner* — Edwin A. Young
(74) *Attorney, Agent, or Firm* — Kinney & Lange, P.A.

(57) ABSTRACT

The present invention relates to a mechanically controlled continuously variable automatic transmission, comprises a housing and a torque converting mechanism mounted in the housing, the torque converting mechanism comprising an input part, a rotatable or rotary carrier, at least one eccentric assembly which is rotatablely mounted on the carrier, and an output part, wherein the input part and the carrier can rotate independently with respect to each other, and have respective rotation axes which are collinear. Each of the at least of one eccentric assembly comprises an eccentric mass which is driven to rotate around its rotation axis by the input part, the output part is provided with only one one-way clutch directly connected therewith. The mechanically controlled continuously variable automatic transmission not only can automatically adjust the output speed and moment depending upon the magnitude of load applied thereto so as to well achieve a function of stepless automatic change of the speed, but is also simple in structure, high in transmission efficiency, and long in life time. Furthermore, the transmission can be applied to an operating condition of high rotary speed and can effectively transmit large power and motive power with large torque, so that it can be used in various vehicles and has a wide application range.

15 Claims, 15 Drawing Sheets

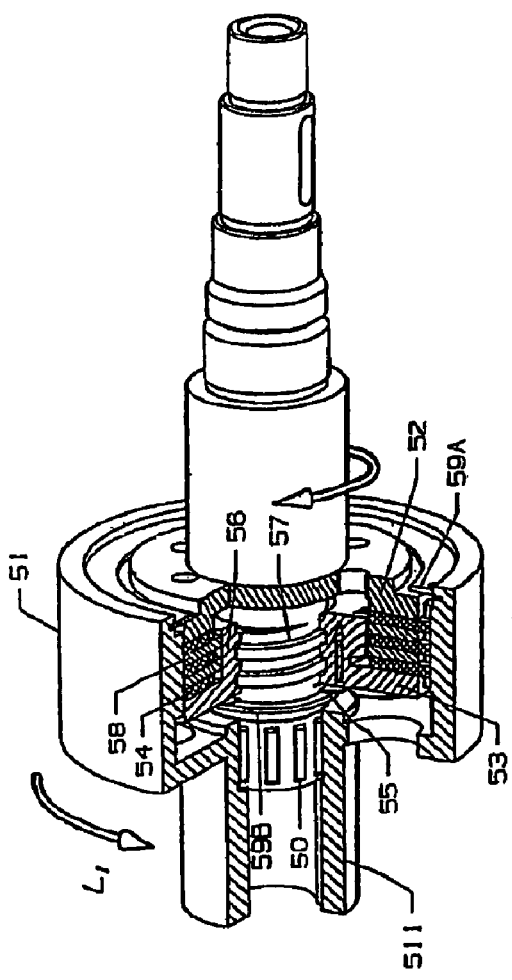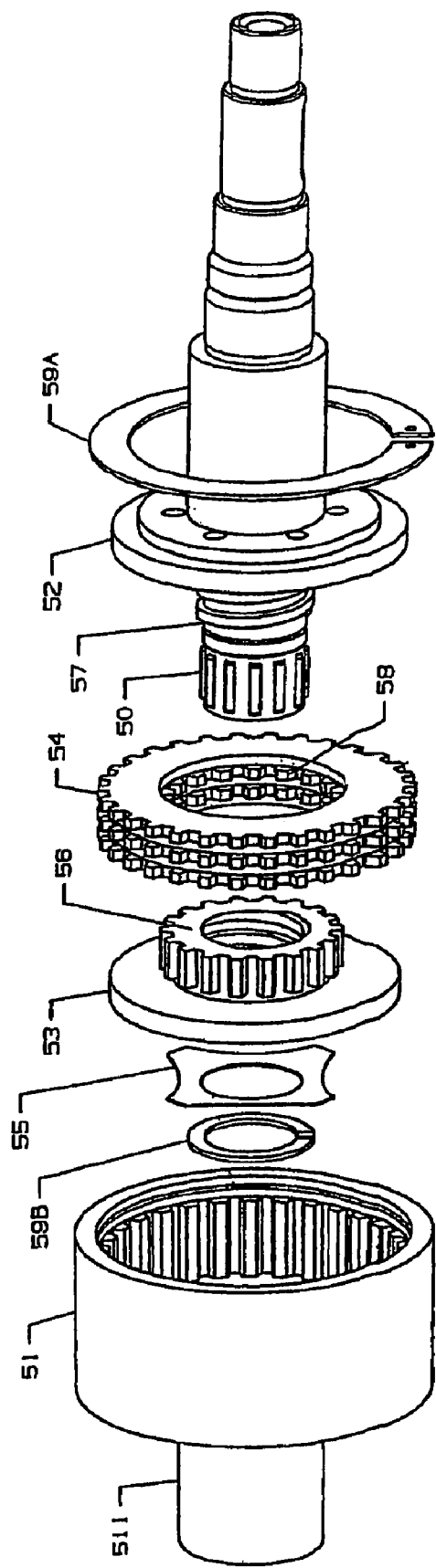
Fig.8A
Fig.8B (a)

(b)

(c)

(d)

MECHANICALLY CONTROLLED CONTINUOUSLY VARIABLE AUTOMATIC TRANSMISSION

BACKGROUND OF THE INVENTION

1. Field of the Invention

The present invention relates to a continuously variable transmission and, in particular to a continuously variable transmission for a vehicle.

2. Description of the Related Art

Vehicles are changed in driving mode from manual gear shifting to automatic gear shifting due to application of continuously variable transmissions to the vehicles. Since vehicles with automatic gear shifting are convenient in operation, fluent in acceleration, and safety in drive, they are increasingly appeal to car-purchasers. In the prior art, the continuously variable transmissions for achieving automatic gear shifting comprise hydraulic automatic transmissions and metal belt type continuously variable transmissions. These two transmissions have many disadvantages which will be described in detail as follows.

The hydraulic automatic transmissions comprise hydraulic couplings and hydraulic torque converters. A hydraulic coupling operates based on the following principle: a power source drives a pump impeller thereof to rotate so that the pump impeller drives liquid among blades of the pump impeller to rotate. As a result, energy from the power source is transmitted to the liquid so that the liquid increases in kinetic energy. When the liquid increasing in kinetic energy enters into spaces between respective blades of a runner, a part of kinetic energy contained in the liquid is transmitted to the runner which rotates slower than the pump impeller so that the runner outputs torque to the outside. In order to increase the torque output from the runner, a reactor, which rotates in one direction, is further disposed between the pump impeller and the runner, so that a hydraulic torque converter is configured.

The hydraulic torque converter can counterbalance some disadvantages of a mechanically controlled step transmission, and has some prominent advantages. For example, a vehicle with a hydraulic torque converter is simple in operation, and labor saving, as well as improves in safety and comfort of drive and in overtaking acceleration, and lowers in harmful exhaust to comply with the environmental protection requirement. Further, since the power source and a gear train are coupled flexibly, a life time of the vehicle lengthens. Finally, the vehicle has excellent adaptability to improve adaptability to various road surfaces. However, the hydraulic torque converter has the following apparent disadvantages.

1. Since the hydraulic torque converter has a small range of change in speed and a small range of change in torque so that it can not separately satisfy a usage requirement of a vehicle, it is necessarily connected in parallel or series with a mechanically controlled transmission cooperating therewith. In addition, in order to achieve an automatic gear shifting of the mechanically controlled transmission, a hydraulic or electric control system is needed to be provided. Therefore, the corresponding structure is complicated, and the manufacturing cost thereof is expensive.

2. Since the energy is transmitted by a liquid as a transmitting medium, transmission efficiency is low, and energy loss is great so that the vehicle is lowered in economic usage of fuel oil.

3. Since the transmission is complicated in structure, it is difficult to service the transmission. Therefore, a special service person that has a high service level and malfunction inspecting and analyzing ability is required for the service. As a result, service cost is high.

Chinese Patent CN No. 1136108C published on Jan. 28, 2004 discloses a hydraulic automatic transmitting system comprising a torque converter for fluidly coupling a engine and a transmission; a primary gear shifting part disposed on a first shaft; a secondary gear shifting part disposed on a second shaft; a power transmitting device (consisting of four power transmitting gears) for transmitting a rotary power from the primary gear shifting part to the secondary gear shifting part; first, second, and third brakes and clutches for controlling the primary gear shifting part and the secondary gear shifting part; and first and second one-way clutches. The torque converter consists of a pump impeller, a runner, a reactor disposed between the pump impeller and the runner. The pump impeller, the runner, and a reactor constitute a hydraulic torque converter. Although the above automatic transmitting system improves a lot over the prior art, it still has many disadvantages as mentioned above.

A metal belt type continuously variable automatic transmission operates based on the following principle: a power output from a power source is transmitted to a driving working wheel of a stepless speed change device, and the driving working wheel transmits the power to a driven wheel via a V-shaped metal belt. After that, the power is transmitted to wheels of a vehicle through an intermediate speed reducer, a main speed reducer, and a differential. A metal belt transmitting device in the transmission is the core of the transmission and comprises the driving working wheel, the driven working wheel, and the V-shaped metal belt connecting the driving working wheel and the driven working wheel. Each of the driving working wheel and the driven working wheel is composed of a stationary cone disc and a movable cone disc assembled coaxially. The stationary cone disc and the movable cone disc form a V-shaped groove with which the V-shaped metal belt engages, so that the V-shaped belt transmits the power under pressing force of the stationary cone disc and the movable cone disc. When the movable cone discs of the driving working wheel and the driven working wheel moves axially during operation, a radius of the metal belt varies, so that a transmission radio is changed. The movable cone disc moves axially by adjusting hydraulic oil within cylinders for the driving working wheel and the driven working wheel which are in turn controlled by means of a mechanical-hydraulic or electric-hydraulic control system. Since pressure of the hydraulic oil can be adjusted continuously, the transmission also can achieve stepless speed change.

With the metal belt type continuously variable automatic transmission, a vehicle has advantages that it is excellent in kinetic characteristic, convenient in operation, and high in transmission efficiency. In addition, the power source can always operate within an economic rotary speed range thereof, so that the vehicle is greatly increased in economic usage of fuel oil and is improved in exhaust. However, the transmission still has the following unsurmountable disadvantages.

1. Since the power is transmitted by means of friction between the metal belt and the driving and driven working wheels, slippage may occur between the metal belt and the driving and driven working wheels so that motive power with a large power or a large torque cannot be transmitted. Therefore, the transmission can not match a power source with a large displacement. Currently, the transmission is only used in cars with a medium or small displacement so that application range thereof is limited.

2. A vehicle with the transmission is low in starting performance. If a driver wants to abruptly accelerate, the transmission can not respond rapidly since it will take time to change diameters of the working wheels. In addition, since the vehicle needs a large starting torque, it is necessarily provided with starting devices such as multiple-disc wet clutches, electromagnetic clutches, and hydraulic torque converters. As a result, the structure of the transmission becomes very complicated.

3. It is difficult to manufacture the metal belt and the manufacturing cost is expensive. Therefore, special equipment for the manufacturing is needed, and an amount of replacement of equipment is large.

Chinese Laid-Open Application CN No. 1442623 published on Sep. 17, 2003 discloses such a metal belt type mechanically controlled frictional continuously variable transmission which has the above disadvantages.

Furthermore, U.S. Pat. No. 6,062,096 discloses a continuously variable transmission which transmits torque by utilizing rocking arms oscillating. Eccentric masses are provided at ends of the rocking arms. An input drives the eccentric masses to rotate around respective axes thereof. Centrifugal forces generated when the eccentric masses rotate drive the rocking arms to oscillate. Although the transmission overcomes some of the disadvantages occurring in the above two transmissions, it still has the following disadvantages.

1. Since the rocking arms oscillate during operation, in order to assure that an output shaft always outputs a speed in one direction, it is required that two one-way clutches which have respective lockup directions opposite to each other are disposed on sleeves directly connected with the rocking arms, and a set of reversing gears are disposed to reverse a rotary speed output from one of the one-way clutches, so as to assure that the one-way clutches output the speed in the same direction. Therefore, the output torque is output alternately through the two one-way clutches. As a result, the transmission is bulky and complicated in structure, and when the output speed is high, the oscillating rocking arms are subject to a large inertia force, thereby making the requirement for material and manufacturing accuracy of the rocking arms and bearings thereof high.

2. Since a one-way clutch is not disposed between the torque converter and a prime mover, a part of kinetic energy stored in the eccentric masses is transmitted back to the prime mover so as to cause circulation of the power, thereby affecting effective exertion of performance of the transmission.

3. Since the masses of the eccentric masses vary by changing phases of the eccentric masses so as to adjust output torque and rotary speed, additional manual or automatic controlling mechanism is required. If the manual controlling mechanism is adopted, the phases of the eccentric masses necessarily are manually adjusted, but can not be automatically adjusted. If the automatic controlling mechanism is added, a complicated feed back system is required, so that the manufacturing cost greatly increases.

4. The one way clutch at output part of the transmission is a radially engaging line-contact sprag clutch, the one way clutch having such structure not only is not sufficiently sensitive in response since the sprags are affected by centrifugal forces generated by rotation thereof, respectively, but also a large moment is required during disengagement and a large amount of energy is consumed so as to decrease the transmission efficiency of the transmission. In addition, since the sprags are in line contact with both an inter ring and an outer ring, the clutch is low in wear resistance so that it can not transmit a large torque and is short in lift time. Therefore, the lift time of the entire transmission is shortened.

U.S. Pat. No. 6,044,718, which is a continuation-in-part of U.S. Pat. No. 6,062,096, further discloses a new solution in addition to the original ones. However, the further disclosed solution is substantially similar to the others. In the further solution, the rocking arm mechanism is substantially not changed, and two one-way clutches which have respective lockup directions opposite to each other are still needed to be disposed on sleeves directly connected with the rocking arms. The further solution differs from the others in that one clutch of the one-way clutches is fitted between the sleeves of the rocking arms and a base frame. The one clutch thus limits swing of the rocking arms towards one direction so that the rocking arms only can swing intermittently in another direction. The transmission not only still has the above disadvantages, but also makes operating condition of the one-way clutch fitted between the rocking arms and the base frame worse, since the base frame is stationary, and the one-way clutch bears a large load so as to limit the swing of the rocking arms towards the one direction. As a result, the sprags of the clutch tightly wedge into the sleeves of the rocking arms and a corresponding hole of the frame, so that it is more difficult to disengage the clutch, more energy is consumed, the wear of the clutch is more severe, and thus the life time is severely affected.

SUMMARY OF THE INVENTION

It is an object of the present application to overcome some of the above disadvantages existing in the prior art. The present application provides a mechanically controlled continuously variable automatic transmission which can automatically adjust the output speed and moment depending upon the magnitude of load applied thereto so as to well achieve a function of stepless automatic change of the speed. Moreover, the transmission is simple in structure, high in transmission efficiency, and long in life time. Furthermore, the transmission can be applied to an operating condition of high rotary speed and can effectively transmit large power and motive power with large torque, so that it can be used in various vehicles and has a wide application range.

The mechanically controlled continuously variable automatic transmission comprises a housing and a torque converting mechanism mounted in the housing. The torque converting mechanism comprises an input part, a rotatable or rotary carrier, at least one eccentric assembly which is rotatablely mounted on the carrier, and an output part. The input part and the carrier can rotate independently with respect to each other, and have respective rotation axes which are collinear. Each of the at least of one eccentric assembly comprises an eccentric mass which is driven to rotate around its rotation axis by the input part. The output part is provided with only one one-way clutch directly connected therewith, and the one-way clutch is a first one-way clutch. The first one-way clutch is an axially pressing surface-contact one-way clutch with a driving part and a driven part arranged axially. When the driving part and the driven part engage with each other, engagement surfaces of engagement elements of the driving part and the driven part abut against each other so as to transmit moment by means of frictional force therebetween.

The mechanically controlled continuously variable automatic transmission according to the present invention further comprises the following additional features.

In a further improved embodiment of the present invention, the transmission further comprises a second one-way clutch located at a front end of the torque converting mechanism which has an input part coupled with a power source and an output part coupled with the input part of the torque converting mechanism.

In a still further improved embodiment of the present invention, the transmission further comprises a third one-way clutch disposed at a rear end of the first one-way clutch, and the third one-way clutch has a lockup direction opposite to that of the first one-way clutch and has a movable part coupled with an output part of the first one-way clutch and a stationary part fixed in the housing.

In a preferable embodiment of the present invention, the torque converting mechanism comprises the carrier, and the at least one eccentric assembly includes two eccentric assemblies symmetrically mounted at two ends of the carrier. Each of the two eccentric assemblies comprises a driven shaft, and the eccentric mass and a driven gear both mounted on the driven shaft. The eccentric masses and the driven gears are hinged to the two ends of the carrier by means of the driven shafts. The input part of the torque converting mechanism comprises a driving shaft and a driving gear mounted on the driving shaft. The driving shaft is coupled with the power source or the second one-way clutch, and the driving gear is in mesh with the driven gears. The output part is an output shaft fixed at a center of the carrier, and the driving part of the first one-way clutch is coupled with the output shaft.

In another preferable embodiment of the present invention, the torque converting mechanism comprises the carrier, and the at least one eccentric assembly includes three eccentric assemblies arranged on the carrier at equal intervals in a circumferential direction thereof. Each of the three eccentric assemblies comprises a driven shaft, and the eccentric mass and a driven gear both mounted on the driven shaft. The carrier is a disc-like body, and the eccentric masses and the driven gears are hinged to an edge of the carrier by means of the driven shafts. The input part of the torque converting mechanism comprises a driving shaft and a driving gear mounted on the driving shaft. The driving shaft is coupled with the power source or the second one-way clutch, and the driving gear is in mesh with the driven gears. The output part is an output shaft fixed at a center of the carrier, and the driving part of the first one-way clutch is coupled with the output shaft.

In a preferable embodiment of the present invention, the first one-way clutch is a screw-pressing one-way clutch which is engaged by screw-pressing. The screw-pressing one-way clutch comprises a clutch drum and first and second clutch discs disposed in the clutch drum and parallel to each other, at least one drum friction plate and at least one spring. The first and second clutch discs clamp the at least one drum friction plate under the action of the at least one spring, and the at least one drum friction plate is fitted over a sleeve and coupled with the clutch drum in such a manner that a torque can be transmitted. The sleeve has an inner thread, and a transmitting shaft projects into the sleeve and has an end projecting into the sleeve which is formed with an outer thread engageable with the inner thread.

In the above preferable embodiment, the at least one drum friction plate includes a plurality of drum friction plates, and a disc friction plate is interposed between every two adjacent drum friction plates. The disc friction plate is fitted over the sleeve and coupled with the sleeve in such a manner that a torque can be transmitted. The clutch drum, the first and second friction discs, the drum friction plates, the sleeve and the disc friction plate have respective rotation axes which are collinear. The drum friction plates are splined to the clutch drum and the disc friction plate is also splined to the sleeve. The clutch drum has one open end and the other end formed with an outwards extending hollow shaft at a center portion thereof. The first clutch disc is fixed on the transmitting shaft, and mounted at the open end of the clutch drum by means of a first snap ring. The second clutch disc is integrally formed with the sleeve, and mounted on the transmitting shaft by means of a second snap ring. Only one spring is provided in the clutch drum. The one spring is a plate-like compression spring fitted over the transmitting shaft, and is disposed between the second snap ring and the second clutch disc. The end, which projects into the sleeve, of the transmitting shaft is supported in the hollow shaft via a bearing.

In another preferable embodiment of the present invention, the first one-way clutch is a four-bar-linkage-mechanism-pressing one-way clutch which is engaged by pressing by a four-bar linkage mechanism. The four-bar-linkage-mechanism-pressing one-way clutch comprises a housing composed of a clutch disc and a clutch cover both combined or covered together, and a clutch hub, a plurality of hub friction plates, at least one set of disc friction plates, and at least one four-bar linkage pressing mechanism are disposed in the housing. A through hole is formed in a center portion of the clutch cover, and an end of the clutch hub is exposed from the through hole. The hub friction plates have a shape of a circular ring, and are fitted over the clutch hub and coupled therewith in such a manner that a torque can be transmitted. A number of sets of the least one set of disc friction plates and a number of the at least one four-bar linkage pressing mechanism are the same, and each set of the at least one set of disc friction plates comprise a plurality of friction plates having a shape of a part of a circular ring which are arranged so as to be alternated with the hub friction plates. Each of the at least one four-bar linkage pressing mechanism has a traverse bar, each set of the at least one set of disc friction plates have a through hole at a same position of respective disc friction plates, and the traverse bars pass through the through holes, respectively. The four-bar linkage mechanisms press the disc friction plates and the hub friction plates against a friction surface of the clutch disc.

In the above preferable embodiment, each of the at least one four-bar linkage pressing mechanism comprise two supporting arms parallel to each other and the traverse bar jointing the two supporting arms. The two supporting arms have ends hinged to the housing by means of jointing pins, respectively, and the other ends hinged to jointing blocks by means of jointing pins, respectively, and the traverse bar has two ends which are fixed to the jointing blocks, respectively. A spring is fitted over the end of the traverse bar and a pressing block is disposed at the other end of the traverse bar, and the pressing block is hinged to the jointing pin. Each set of the at least one set of the disc friction plates are further provided with two through holes through which two cylindrical pins pass, respectively, so that the respective disc friction plates are connected together in series. The clutch disc and the clutch cover are correspondingly formed with two elongate grooves extending in a circumferential direction, respectively. Two ends of each of the two cylindrical pins are inserted in the elongate grooves, each of the ends of the two cylindrical pins is provided with two planes parallel to each other, each of the elongate grooves is provided with two planes parallel to each other, and the two planes of each of the ends fit with the corresponding two planes of each of the elongate grooves. The hub friction plates are splined to the clutch hub. A transmitting shaft is mounted at a center of the clutch disc, and has an end projecting outwards and the other end supported in a center hole of the clutch hub through a bearing. The at least one four-bar linkage pressing mechanism includes three four-bar linkage pressing mechanisms disposed on the housing, the at least one set of disc friction plate includes three sets of disc friction plates correspondingly disposed in the housing, the three four-bar linkage pressing mechanisms and the three sets of friction plates are arranged in equal intervals in a circumferential direction.

The mechanically controlled continuously variable automatic transmission according to the present application has following advantages with respect to the prior art.

1. Since the mechanically controlled transmission transmits torque by changing a moment of momentum of the eccentric mass, output rotation speed and moment can be automatically adjusted depending on magnitude of a load without other manual control or electronic feedback system. Not only a function of automatic stepless speed change is achieved really, but also the structure of the transmission is simplified and the manufacturing cost of the transmission is decreased.

2. The transmission of the present invention is not only high in transmission efficiency, but also can effectively transmit large power and motive power with large torque. Since the energy is transmitted by means of the eccentric mass as a transmitting medium, which differs from the case where the energy is transmitted by means of the fluid as a transmitting medium, not only the transmission efficiency is high, but also the large power and the motive power with large torque can be transmitted. Therefore, the transmission can be applied to cars with a medium or small displacement as well as heavy vehicles with a large displacement. The transmission can be applied widely. A hydraulic torque converter and a metal belt type continuously variable automatic transmission cannot compare with the transmission of the present invention in terms of the advantages.

3. The torque converting mechanism of the transmission of the present invention is more reasonable in structure and working conditions. The output of the carrier of the transmission according to the present invention is provided with only one one-way clutch directly coupled therewith in order to achieve unidirectional torque and speed output without the carrier of the torque converting being necessarily limited to oscillate and two one-way clutches and a reversing mechanism disposed at an output of the carrier. In this way, not only the working conditions of the carrier of the torque converting mechanism are improved so that the function of automatic stepless speed change is achieved better, but inertia force to which the carrier of the torque converting mechanism is subjected greatly decreases, so that strength requirement for components of the transmission greatly lowers. Therefore, the transmission of the present invention can be suitable for a high speed engine of a speed of up to 6000 rpm.

4. A greater torque ratio can be obtained with the transmission of the present invention, and the transmission of the present invention has larger transmission efficiency. Since a one-way clutch is also disposed between an engine and the input of the torque converting mechanism, it can be assured that kinetic energy stored in the eccentric assembly can not be transmitted back to the engine so that more energy can be transmitted to a load. Therefore, the torque ratio of the entire transmission becomes greater, the transmission efficiency of the entire transmission is higher, and the structure of the entire transmission is finer.

5. An axially pressing surface-contact one-way clutch is adopted in the present invention. The one-way clutch not only is sensitive in response so as to satisfy requirement of an engine operating at a high speed, but also can transmit a large torque and has high transmission efficiency and long life time. Therefore, the entire transmission becomes stable and reliable in performance, low in failure rate, and long in life time.

BRIEF DESCRIPTION OF THE DRAWINGS

The features and the advantages of the present invention will be further explained in detail by embodiments taken in combination with accompanying drawings, in which:

FIG. 8A is a perspective view of a configuration type of first and second one-way clutches in the embodiments shown in FIGS. 2 through 5;

FIG. 8B is an exploded perspective view of the clutches shown in FIG. 8A;

DETAILED DESCRIPTION OF THE EMBODIMENTS

Figure 1A:
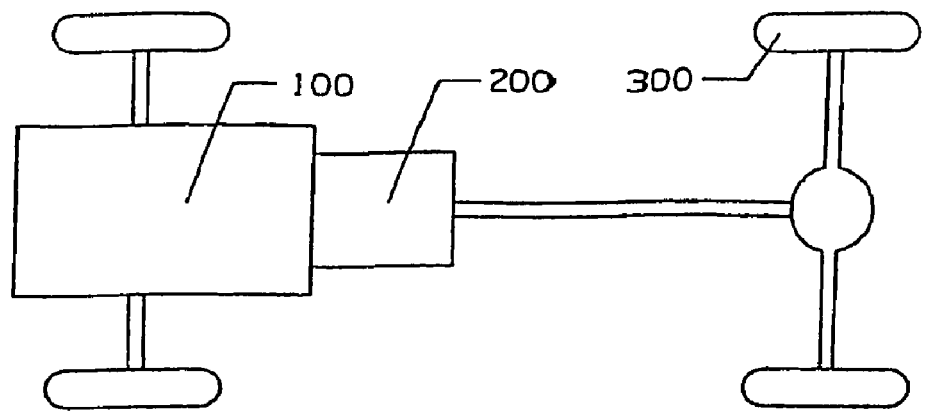
FIG. 1A is a schematic block diagram of a configuration of a drive system of a vehicle showing a general mounting position of a continuously variable automatic transmission according to the present invention.

Referring to FIG. 1A, a configuration of a drive system of a vehicle is schematically shown. The drive system comprises a power source 100, a transmission 200, and a load 300 (i.e., wheels and the like). The power source 100 comprises an engine, a motor, or other prime movers. The present invention is explained with respect to the engine for convenient description. The transmission 200 is mounted between the power source 100 and the load 300, and power output from the power source 100 is transmitted to the wheels 300 of a vehicle by torque and speed changes by the transmission 200, so that the wheels rotate, thereby driving the vehicle to move forward or backward. The prevent invention improves the transmission 200 in the system.

Figure 1B:
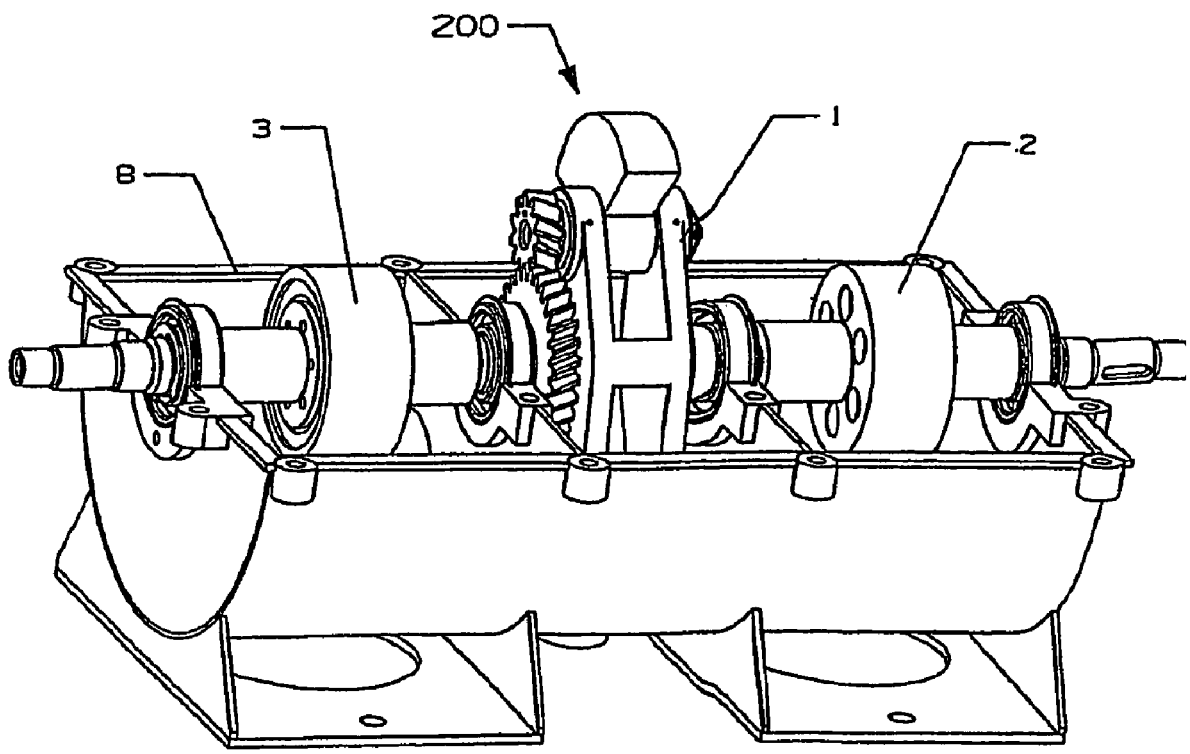
FIG. 1B is a perspective view of a mechanical configuration of a continuously variable automatic transmission according to the present invention.
Figure 2:
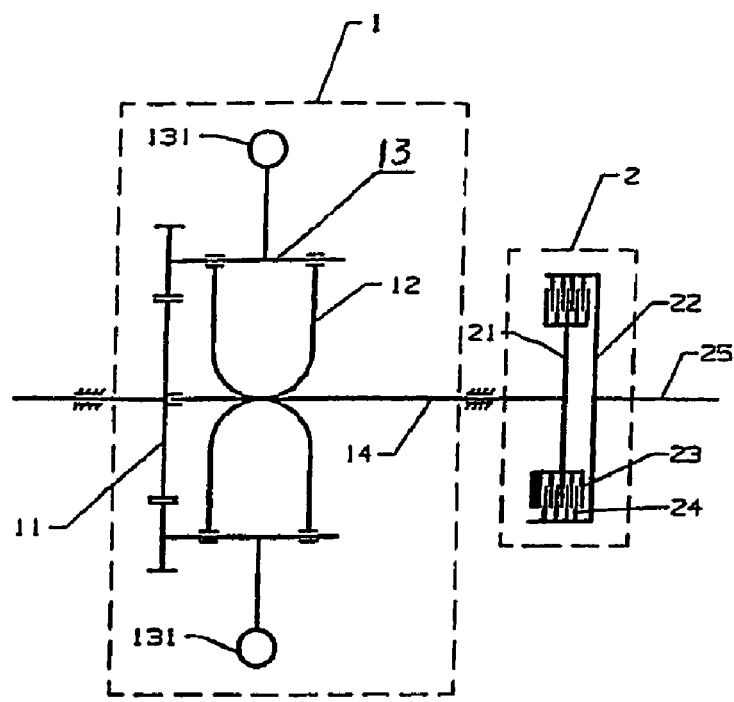
FIG. 2 is a schematic block diagram of a preferable embodiment of the present invention showing a basic configuration.

With reference to FIG. 1B, a mechanically controlled continuously variable automatic transmission 200 comprises a housing 8 and a torque converting mechanism 1 mounted in the housing 8. The torque converting mechanism 1 includes an input part 11, a rotatable or rotary carrier 12, at least one eccentric assembly 13 (two eccentric assemblies are shown in FIG. 2) which is rotatably mounted on the carrier 12, and an output part 14, as shown in FIG. 2. As shown, the input part 11 and the carrier 12 can rotate independently with respect to each other, and have respective rotation axes which are collinear. Each of the at least one eccentric assembly 13 comprises an eccentric mass 131 which is driven to rotate around its rotation axis by the input part 11, and a specific configuration of which will be described in detail in the following.

The output part 14 is provided with only one one-way clutch 2 directly connected therewith. The power subjected to torque change and speed change by the torque converting mechanism 1 is output through the one one-way clutch 2. That is, a rotation speed can be output in a single direction. Therefore, the torque converting mechanism is simple in structure, convenient in assembly, and low in manufacturing cost.

The one-way clutch 2 is a first one-way clutch. The first one-way clutch 2 is an axially pressing surface-contact one-way clutch with an engagement element 23 of a driving part 21 and an engagement element 24 of a driven part 22 arranged axially, as shown in FIG. 2. When the driving part and the driven part engage with each other, engagement surfaces of engagement elements 23 and 24 abut against each other so as to transmit moment by means of frictional force therebetween. Not only the first one-way clutch is high in transmission efficiency and can satisfy requirements of operating conditions of high speed and high frequency in running of a vehicle, but also excellent in wear resistance and long in life time, as compared with a radially pressing point-contact clutch in the prior art. An output shaft 25 of the one-way clutch 2 is coupled with the load 300 directly or through an auxiliary device 7 to be described in the following to transmit the moment to the load 300.

Figure 3:
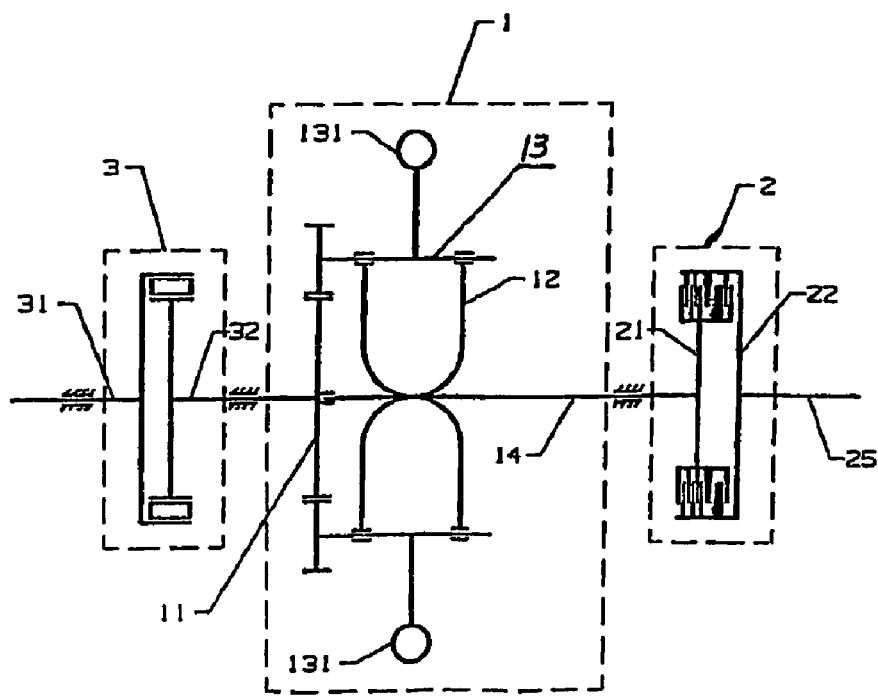
FIG. 3 is a schematic block diagram of another preferable embodiment of the present invention showing a basic configuration, in which a second one-way clutch is added based on the preferable embodiment shown in FIG. 2.

Referring to FIG. 3, as a further improvement of the above preferable embodiment, the transmission 200 further comprises a second one-way clutch 3 located at a front end of the torque converting mechanism 1. The second one-way clutch 3 has an input part 31 coupled with the power source 100 and an output part 32 coupled with the input part 11 of the torque converting mechanism 1. A lockup direction of the second one-way clutch 3 is the same as a forward rotation direction of the engine and a lockup direction of the first one-way clutch 2. With the second one-way clutch 3, the power of the engine is transmitted to the torque converting mechanism 1 only in a single direction. Even if a rotation speed of the output part 11 of the torque converting mechanism 1 is higher than that of the engine, since the second one-way clutch 3 is in an overrunning state when it rotates in a reverse direction, a moment in the reverse direction can not be transmitted back to the engine so that energy stored in the eccentric assembly 13 can be transmitted to the first one-way clutch 2 even more. Therefore, the transmission of the present invention can obtain a large torque ratio and circulation of power to lower the transmission efficiency does not occurs.

Figure 4:
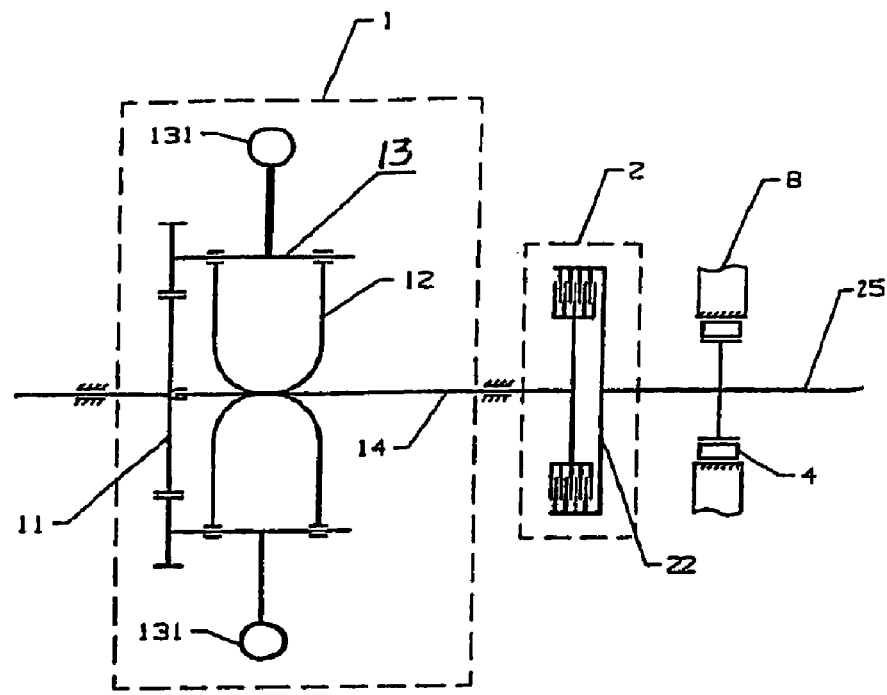
FIG. 4 is a schematic block diagram of a further preferable embodiment of the present invention showing a basic configuration, in which a third one-way clutch is added based on the preferable embodiment shown in FIG. 2.
Figure 5:
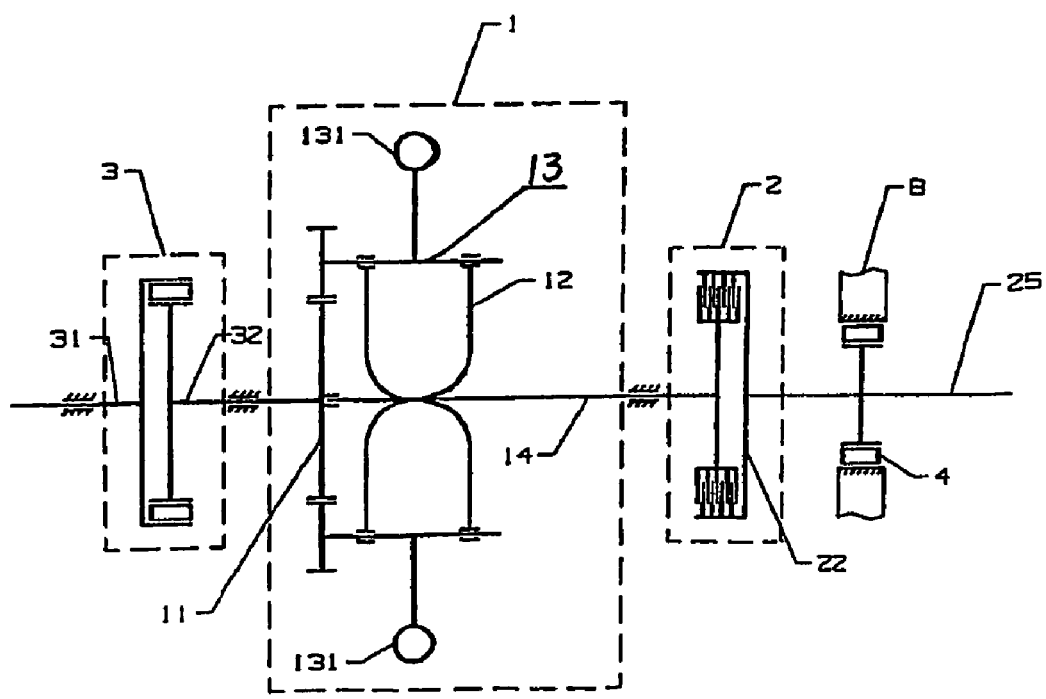
FIG. 5 is a schematic block diagram of a still further preferable embodiment of the present invention showing a basic configuration, in which a third one-way clutch is added based on the preferable embodiment shown in FIG. 3.

With reference to FIGS. 4 and 5, as a further improvement of the above two preferable embodiments, the transmission 200 further comprises a third one-way clutch 4 disposed at a rear end of the first one-way clutch 2. The third one-way clutch 4 has a lockup direction opposite to that of the first one-way clutch 2 and has a movable part coupled with the driven part 22 of the first one-way clutch 2 and a stationary part fixed in the housing 8. The third one-way clutch 4 may comprise a roller or sprag one-way clutch in the prior art, which is adapted to limit a reverse rotation of the output part 25 of the first one-way clutch 2. Therefore, the third one-way clutch 4 does not constrain a moving state of the carrier 12. For example, when a vehicle is in a forward or driving shift while stopping on an upwardly-inclined road, even if a parking brake is not actuated, the vehicle can not move backwards due to constraining action of the third one-clutch, which is greatly convenient for a driver to drive. The third one-way clutch has a function different from that of a one-way clutch disposed between a sleeve of a rocking arm and a base frame in U.S. Pat. No. 6,044,718 which directly limits a rotation of the rocking arm towards a direction.

Figure 6A:
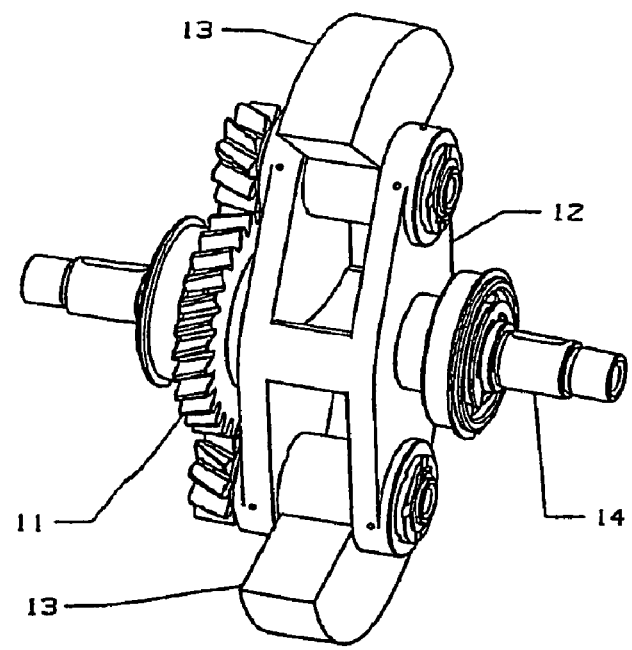
FIG. 6A is a perspective view of a torque converting mechanism in the embodiments shown in FIGS. 2 through 5, in which the torque converting mechanism comprises two eccentric assemblies.
Figure 6B:
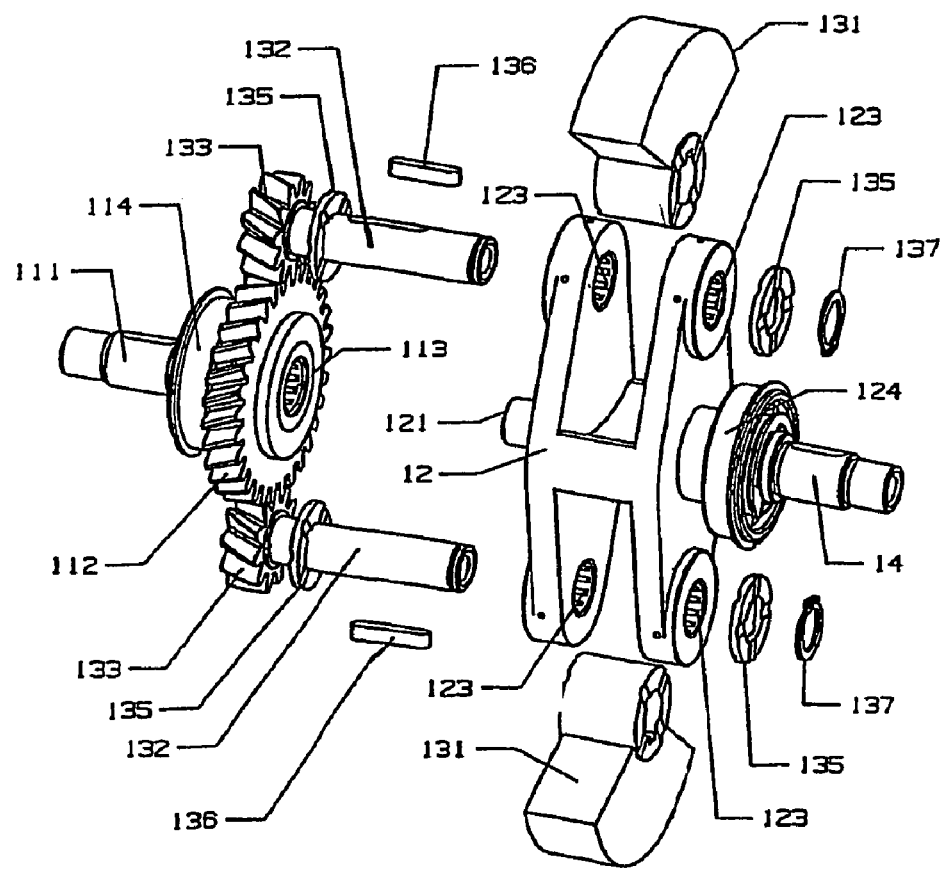
FIG. 6B is an exploded perspective view of the torque converting mechanism of FIG. 6A showing specific configurations and mounting manners of components thereof.

As an example of the preferable embodiments shown in FIGS. 2 through 5, the torque converting mechanism 1 is configured as shown in FIGS. 6A and 6B. The torque converting mechanism 1 comprises the carrier 12, and the at least one eccentric assembly includes two eccentric assemblies 13 symmetrically mounted at two ends of the carrier 12. Each of the two eccentric assemblies 13 comprises a driven shaft 132, and the eccentric mass 131 and a driven gear 133 both mounted on the driven shaft 132. The eccentric mass 131 and the driven gear 133 are hinged to the two ends of the carrier 12 by means of the driven shafts 132. As shown, the carrier 12 has a H-shaped longitudinal section, and the driven shafts 132 pass through two side walls of the carrier 12. Each of the driven shafts 132 has one end fixed with the driven gear 133, and the other end fixed by means of a snap ring 137. Spacers 135 are interposed between the snap rings 137 and the side wall of the carrier 12 as well as between the driven gears 133 and the side wall of the carrier 12, respectively, so as to reduce wear of the carrier 12. The eccentric masses 131 is held between the two side walls of the carrier 12, so as to be axially positioned conveniently and so as to be safe and reliable.

As shown in FIGS. 6A and 6B, the input part 11 of the torque converting mechanism 1 comprises a driving shaft 111 and a driving gear 112 mounted on the driving shaft 111. The driving shaft 111 is coupled with an output shaft of the engine (in the embodiments shown in FIGS. 2 and 4), or the output part of the second one-way clutch 3 (in the embodiments shown in FIGS. 3 and 5). The driving gear 112 is in mesh with the driven gears 133. The output part 14 is an output shaft fixed at a center of the carrier 12, and the driving part 21 of the first one-way clutch 2 is coupled with the output shaft 14. The eccentric masses 131 are connected with the driven shafts 132 by means of keys 136, respectively. Therefore, when the driving gear 112 drives the driven gear 133 to rotate, the eccentric masses 131 rotate around the driven shaft 132 as an axis over an entire circumference and thus generate centrifugal forces to drive the carrier 12 to rotate. The centrifugal forces generated by the eccentric masses 131 drive the carrier 12 to rotate.

Figure 6C:
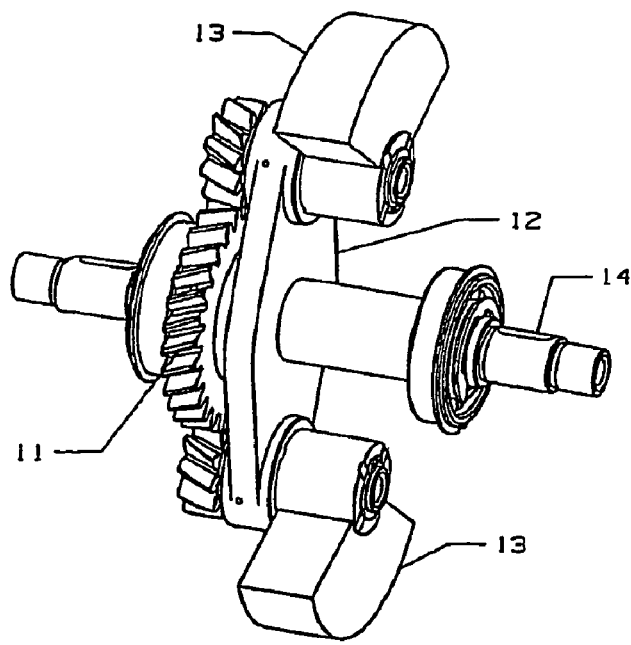
FIG. 6C is a configuration of a torque converting mechanism with which the torque converting mechanism shown in FIG. 6A is replaced.
Figure 6D:
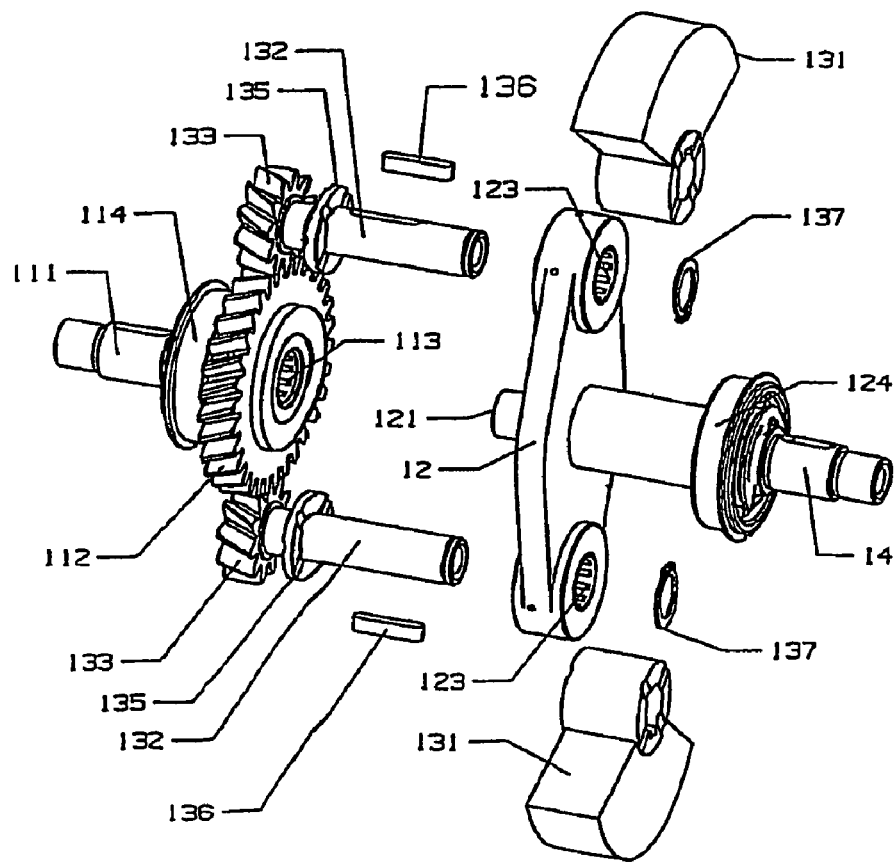
FIG. 6D is an exploded perspective view of the torque converting mechanism of FIG. 6C showing specific configurations and mounting manners of components thereof.

FIGS. 6C and 6D show an alternative embodiment of the torque converting mechanism which differs from that shown in FIGS. 6A and 6B in that the carrier 12 has a flat plate shape. The carrier 12 is simpler in structure and the torque converting mechanism 1 and the entire transmission 200 decrease in weight, as compared with the above carrier 12.

Figure 7A:
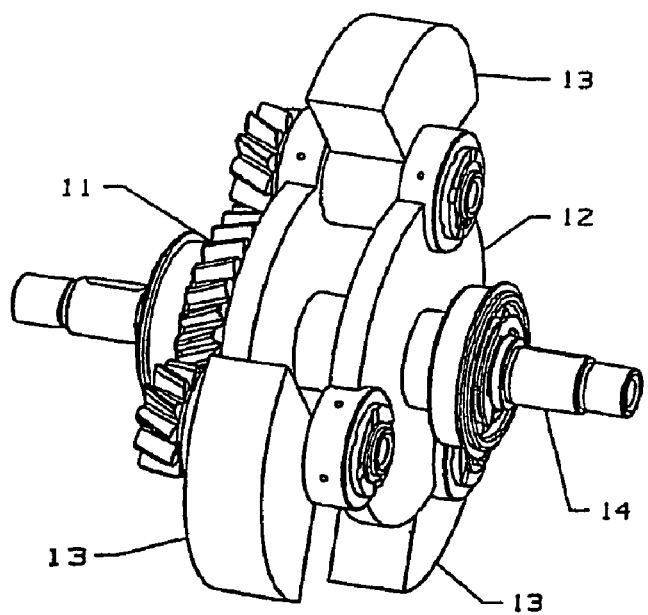
FIG. 7A is a perspective view of another torque converting mechanism in the embodiments shown in FIGS. 2 through 5, in which the torque converting mechanism comprises three eccentric assemblies.
Figure 7B:
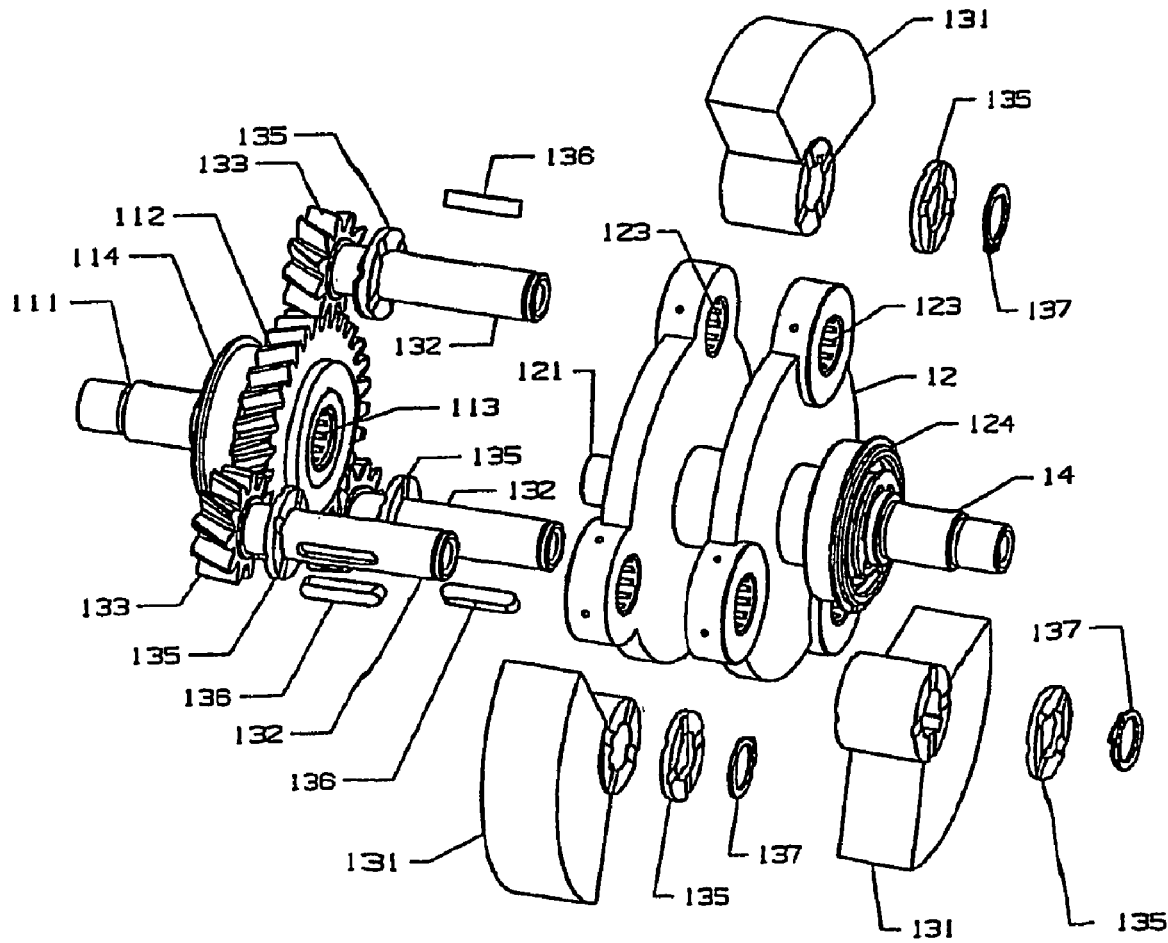
FIG. 7B is an exploded perspective view of the torque converting mechanism of FIG. 7A showing specific configurations and mounting manners of components thereof.

As another example of the preferable embodiments shown in FIGS. 2 through 5, the torque converting mechanism 1 is configured as shown in FIGS. 7A and 7B. The torque converting mechanism 1 comprises the carrier 12, and the at least one eccentric assembly includes three eccentric assemblies 13 arranged on the carrier 12 at equal intervals in a circumferential direction thereof. Each of the three eccentric assemblies 13 comprises a driven shaft 132, and the eccentric mass 131 and a driven gear 133 both mounted on the driven shaft 132. As shown, the carrier 12 is a disc-like body, and the eccentric masses 131 and the driven gears 133 are hinged to an edge of the carrier 12 by means of the driven shaft 132. This torque converting mechanism can generate greater torque ratio so as to be more suitable for heavy vehicles with a large load as compared with the torque converting mechanism shown in FIGS. 6A and 6D. Since the three eccentric assemblies 13 are distributed at equal intervals in the circumferential direction, it can be assured that radial forces acting on the carrier 12 in a radial direction with respect to a rotation axis thereof always are balanced, and circumferential forces acting on the carrier 12 are in a same circumferential or rotational direction so as to produce a moment of couple to drive the carrier 12 rotate the rotation axis thereof.

Figure 7C:
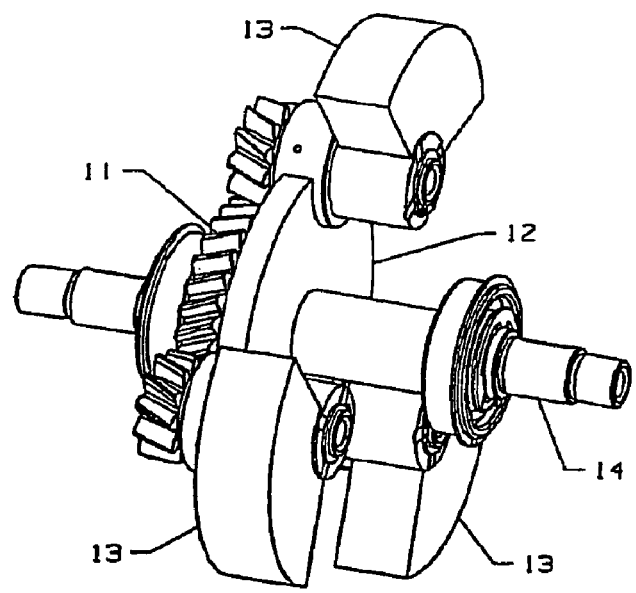
FIG. 7C is a configuration of a torque converting mechanism with which the torque converting mechanism shown in FIG. 7A is replaced.
Figure 7D:
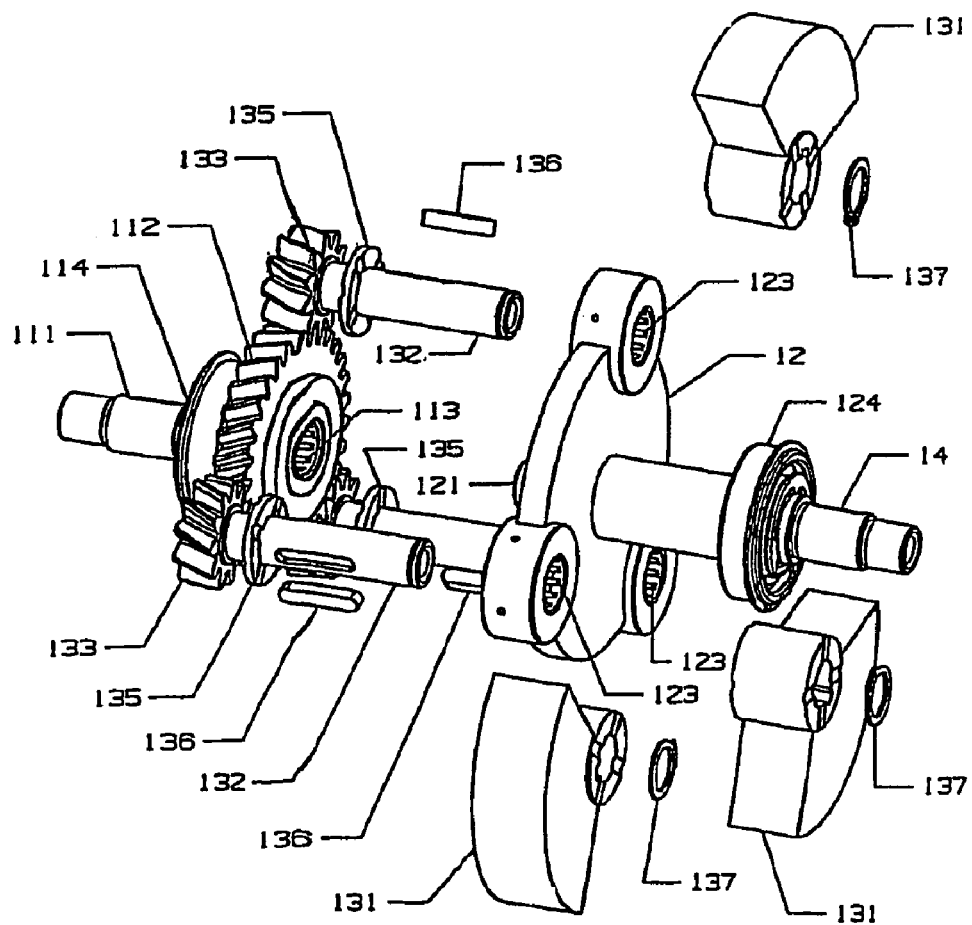
FIG. 7D is an exploded perspective view of the torque converting mechanism of FIG. 7C showing specific configurations and mounting manners of components thereof.

The input part 11 and the output part 12 of the torque converting mechanism 1 have the same configuration as those of the above embodiments. The input part 11 comprises a driving shaft 111 and a driving gear 112 mounted on the driving shaft 111. The driving shaft 111 is coupled with the output shaft of the engine (in the embodiments shown in FIGS. 2 and 4), or the second one-way clutch 3 (in the embodiments shown in FIGS. 3 and 5). This embodiment is different from the above embodiments in that the driving gear 112 is in mesh with the three driven gears 133. The output part 14 is an output shaft fixed at a center of the carrier 12, and the driving part 21 of the first one-way clutch 2 is coupled with the output shaft 14. Similar to the above embodiment, the FIGS. 7C and 7D show an alternative embodiment of the torque converting mechanism which differs from that shown in FIGS. 7A and 7B in that the carrier 12 has a flat plate shape.

Thus, the carrier 12 is simpler in structure and the torque converting mechanism 1 and the entire transmission 200 decrease in weight.

With reference to FIGS. 8A and 8B, as an example of the preferable embodiments shown in FIGS. 2 through 5, the first one-way clutch 2 is a screw-pressing one-way clutch which is engaged by screw-pressing. The screw-pressing one-way clutch comprises a clutch drum 51 and first and second clutch discs 52 and 53 disposed in the clutch drum 51 and parallel to each other, at least one drum friction plate 54 and at least one spring 55. The spring 55 can apply a pre-pressing force to the first and second clutch discs 52 and 53. The first and second clutch discs 52 and 53 clamp the at least one drum friction plate 54 under the action of the spring 55, and the at least one drum friction plate 54 is fitted over a sleeve 56 and coupled with the clutch drum 51 in such a manner that a torque can be transmitted. The sleeve 56 has an inner thread, and a transmitting shaft 57 projects into the sleeve 56 and has an end projecting into the sleeve which is formed with an outer thread engageable with the inner thread.

As shown in FIGS. 8A and 8B, in a preferable embodiment of the present invention, the at least one drum friction plate includes a plurality of drum friction plates 54, and a disc friction plate 58 is interposed between every two adjacent drum friction plates 54. The disc friction plate is fitted over the sleeve 56 and coupled with the sleeve in such a manner that a torque can be transmitted. When a moment is transmitted from a left side to a right side (which are described with respect to FIGS. 8A and 8B), the clutch drum 51 and the drum friction plates 54 constitute the driving part 21 of the first one-way clutch 2, the disc friction plate 58, the sleeve 56, the first and second clutch discs 52 and 53, and the transmitting shaft 57 constitute the driven part 22 of the first one-way clutch 2, and the drum friction plates 54 and the disc friction plate 58 correspond to the engagement elements 23 and 24 of the driving part and the driven part, respectively. When one drum friction plate 54 is used, the first and second clutch discs 52 and 53 correspond to the engagement element 24 of the driven part 22, that is, the disc friction plates. Therefore, it is not needed to provide the disc friction plate 58.

As shown in FIGS. 8A and 8B, the clutch drum 51, the first and second friction discs 52 and 53, the drum friction plates 54, the sleeve 56 and the disc friction plate 58 have respective rotation axes which are collinear. The drum friction plates are splined to the clutch drum 51 and the disc friction plate 58 is also splined to the sleeve 56. With the spline coupling, not only it can be assure that input torque can be effectively transmitted, but also the torque converting mechanism is convenient in manufacture and manufacture cost thereof is reduced. The clutch drum 51 has one open end (right end in FIGS. 8A and 8B) and the other end formed with an outwards extending hollow shaft 511 at a center portion thereof. The end, which projects into the sleeve, of the transmitting shaft 57 is supported in the hollow shaft 511 via a bearing 50. Therefore, it is convenient to mount and position the transmitting shaft 57, and it can be assured that the axes of the transmitting shaft 57 and the clutch drum 51 are collinear. In a preferable embodiment of the present invention, the bearing 50 comprises needle roller bearing which facilitates to assure accurate positioning of the transmitting shaft.

As shown in FIGS. 8A and 8B, the first clutch disc 52 is fixed on the transmitting shaft 57, and mounted in the open end of the clutch drum 51 by means of a first snap ring 59A. The second clutch disc 53 is integrally formed with the sleeve 56, and mounted on the transmitting shaft 57 by means of a second snap ring 59B. As shown in FIGS. 8A and 8B, in a preferable embodiment of the present application, only one spring 55 is provided in the clutch drum 51. The spring 55 is a plate-like compression spring fitted over the transmitting shaft 57, and is disposed between the second snap ring 59B and the second clutch disc 53. With the plate-like compression spring, not only a pre-pressing force can be applied, but the clutch is small in axial size, so that a space occupied by the spring 55 in the one-way clutch drum and in turn the volume of the entire one-way clutch are reduced.

Figure 8C:
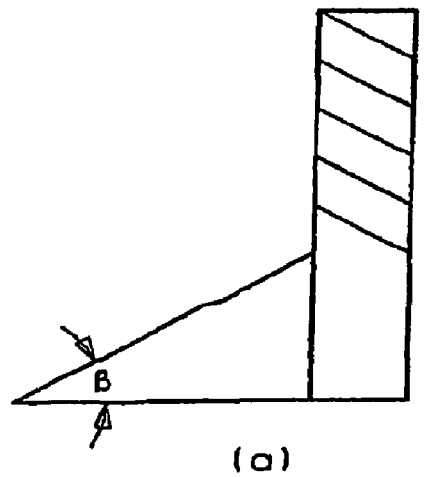
FIG. 8C includes four block diagrams which all together show operation principle of the one-way clutches of FIG. 8A.
Figure 8C:
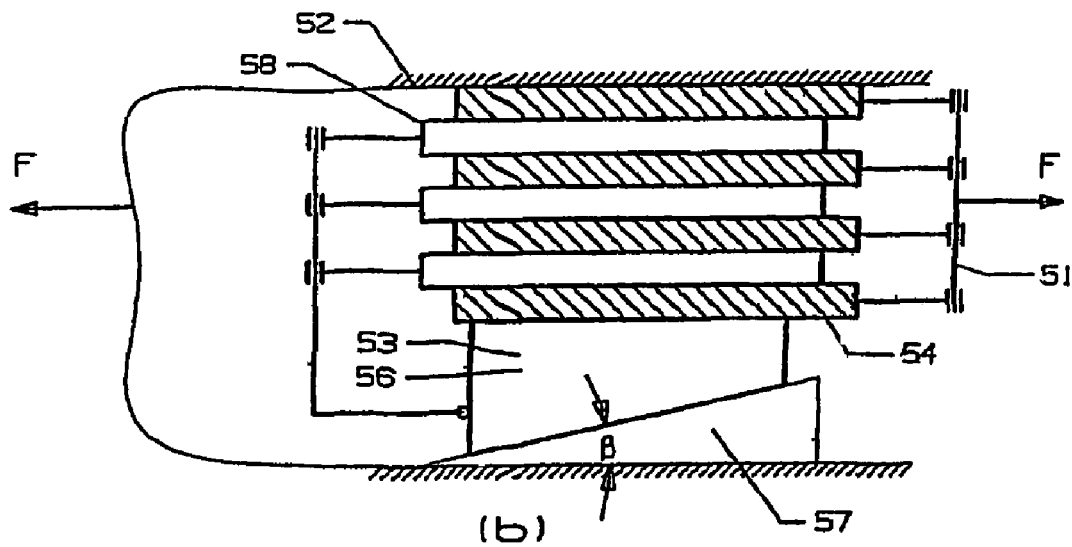
Figure 8C:
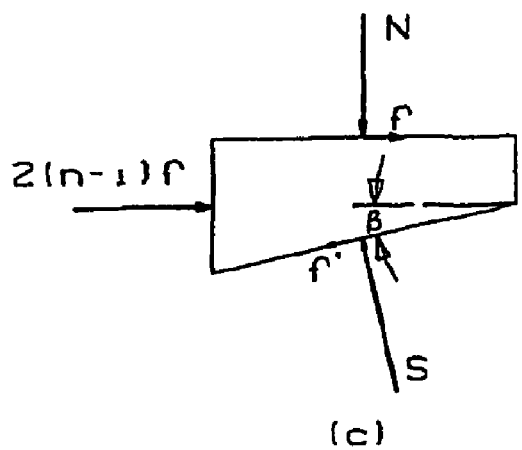
Figure 8C:
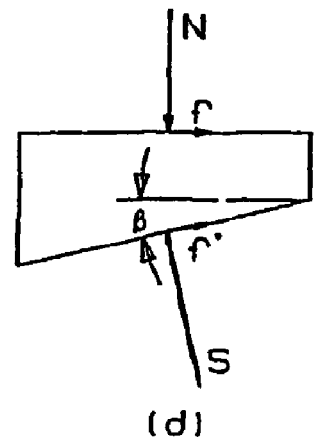

In regard to the first one-way clutch 2, in use, the hollow shaft 511 of the clutch drum 51 is coupled with the output shaft 14 of the torque converting mechanism 1 through a key, and the transmitting shaft 57 is also coupled with an outer part by a key. Referring to FIGS. 8A and 8C, operating principle and operation process of the screw-pressing one-way clutch are explained as follows. When the output shaft 14 rotates in a direction L1 (a lockup direction of the one-way clutch) in the case where a resistance direction of a load is opposite to the direction L1, the output 14 drives the clutch drum 51 and the drum friction plates 54 to rotate in the direction L1. Because of action of the pre-pressing force of the compression spring 55, there is frictional force between the drum friction plates 54 and the disc friction plate 58. The drum friction plates 54 drive the disc friction plate 58 to rotate likewise in the direction L1 by means of the frictional force. The disc friction plate 58 drives the sleeve 56 to rotate in the direction L1 through the spline. Since the transmitting shaft 57 and the sleeve 56 are coupled with each other by right-hand thread, the sleeve 56 and the second clutch disc 53 move alone the transmitting shaft 57 towards a right side so as to further press the drum friction plates 54 and the disc friction plate 58. At that time, the one-way clutch is in a lockup state so that the transmitting shaft 57 also rotates in the direction L1. Otherwise, the one-way clutch is in a overrunning state. An equivalent coefficient of friction can effectively increase by providing a plurality of drum friction plates 54 and a plurality of disc friction plates 58. In the case where the drum friction plates 54 and the disc friction plates 58 do not vary in number, self-locking can be achieved between the driving part 21 and the driven part 22 by reasonably designing size of a helix angle β, i.e. assuring that the input moment is in the direction L1. Otherwise, when the input moment is in a direction opposite to the direction L1, the clutch is in an overrunning state so that it can not transmit moment. When the transmitting shaft 57 and the sleeve 56 are coupled with each other by left-hand thread, the lockup direction is opposite to that mentioned above.

FIG. 8C is a schematic block diagram showing operation principle of the screw-pressing one-way clutches of FIG. 8A. A basic principle of the spiral pressing is identical to a basic principle of inclined plane pressing. A thread corresponds to a formation of a hypotenuse of a right triangle by winding the right triangle around a cylinder in the case where a right-angle side of the right triangle is perpendicular to an axis of the cylinder, and an inclination angle β of the hypotenuse corresponds to a helix angle of the thread. The operation principle of the screw-pressing one-way clutches is shown in FIG. 8C(b). Fit between a wedge and an inclined plane corresponds to fit between an inner thread of the sleeve 56 and an outer thread of the transmitting shaft 57, the wedge corresponds to a combination of the second clutch disc 53 and the sleeve 56, and the inclined plane and a portion integral therewith correspond to a combination of the transmitting shaft 57 and the first clutch disc 52.

Figure 8D:
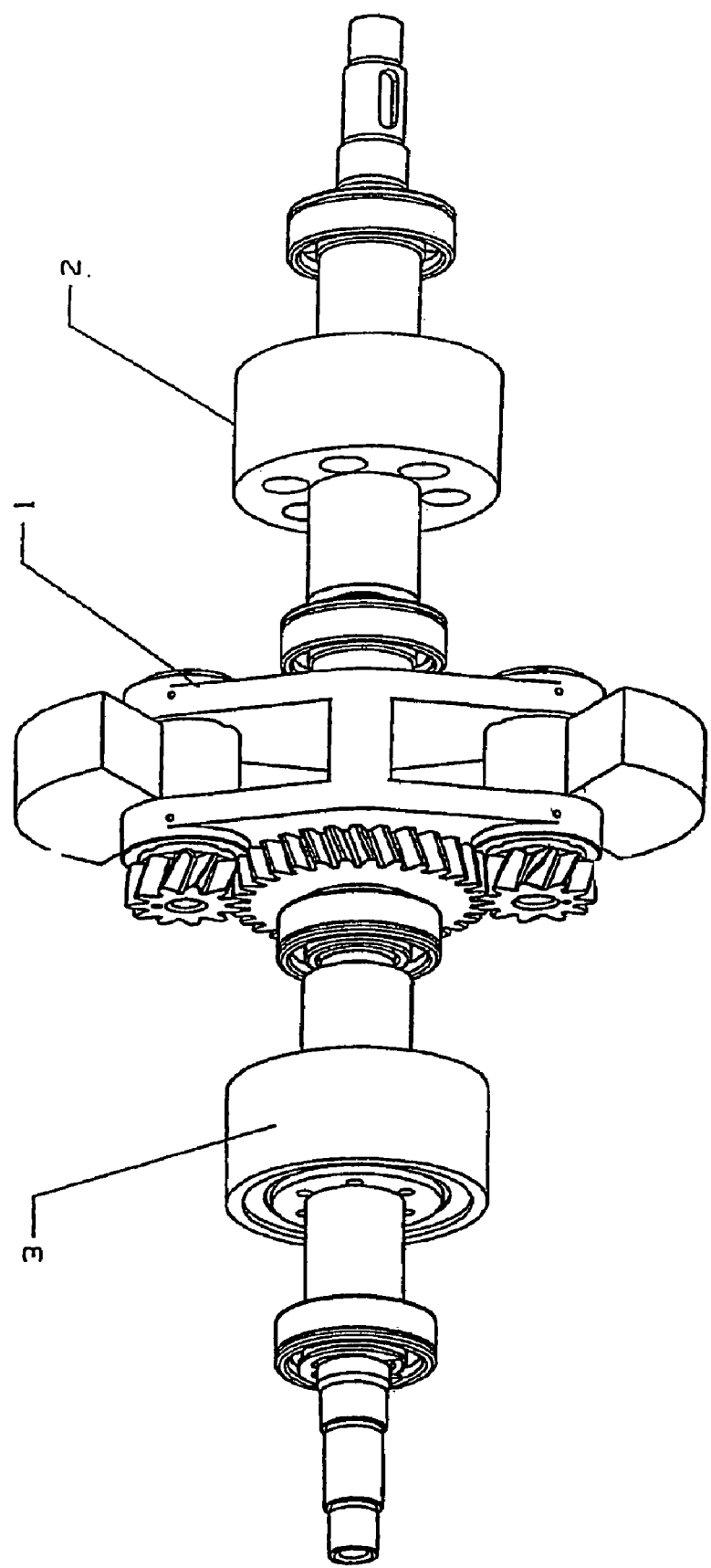
FIG. 8D is a view showing an entire mechanical configuration of a transmission of the present invention in the case where both the first and second one-way clutches adopt those shown in FIGS. 8A and 8B.

Referring to FIG. 8D, as a preferable embodiment of the present invention, the second one-way clutch 3 located at the front end of the torque converting mechanism 1 is the screw-pressing one-way clutches of FIGS. 8A and 8B, too. Therefore, the second one-way clutch 3 can also transmit large torque and motive power with large power and is long in life time. The transmission with the above configuration can be applied to not only small cars, but also heavy vehicles.

Figure 9A:
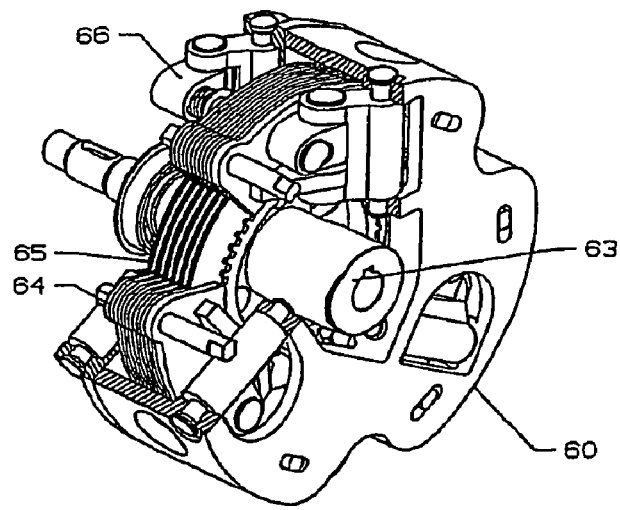
FIG. 9A is a perspective view of another configuration type of first and second one-way clutches in the embodiments shown in FIGS. 2 through 5.
Figure 9B:
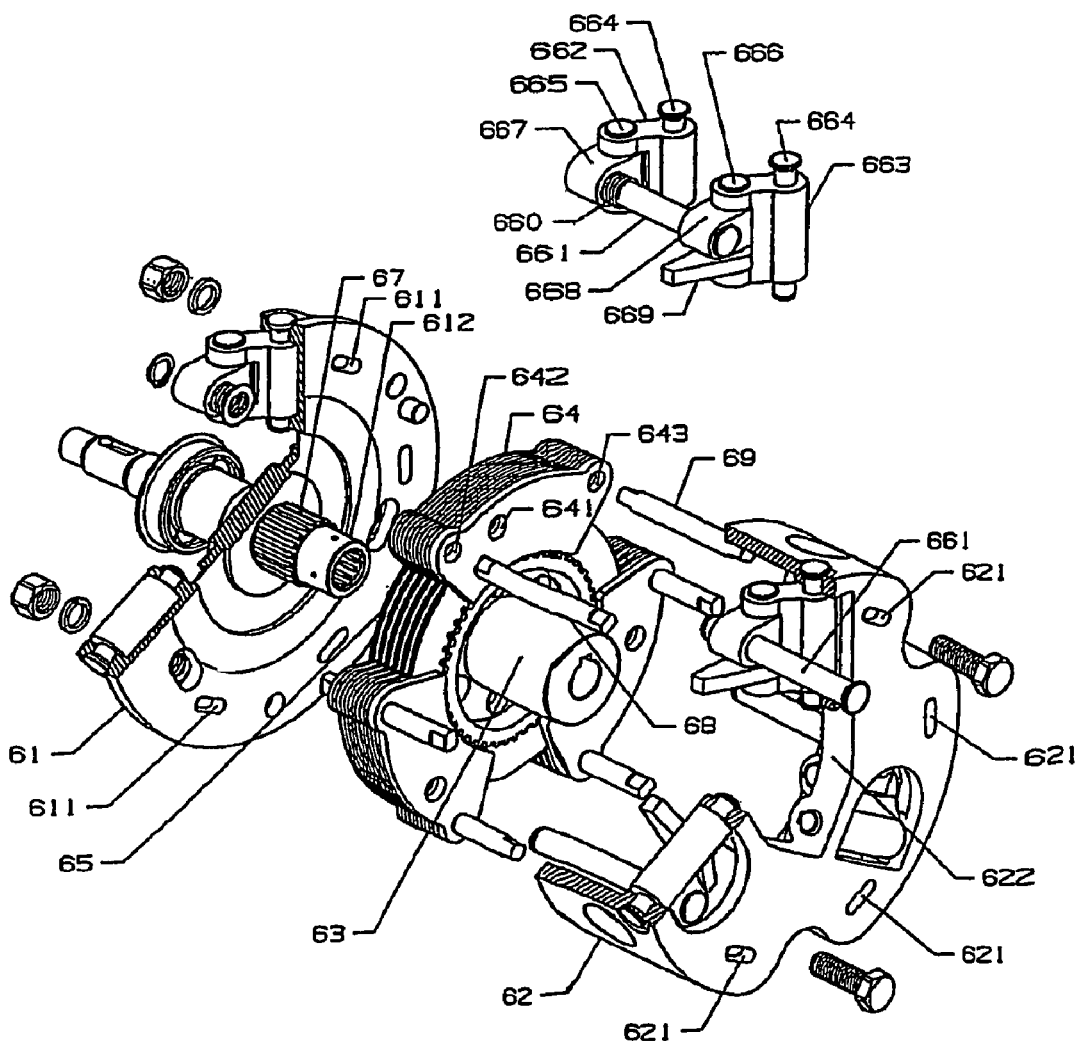
FIG. 9B is an exploded perspective view of the clutches shown in FIG. 9A.
Figure 9C:
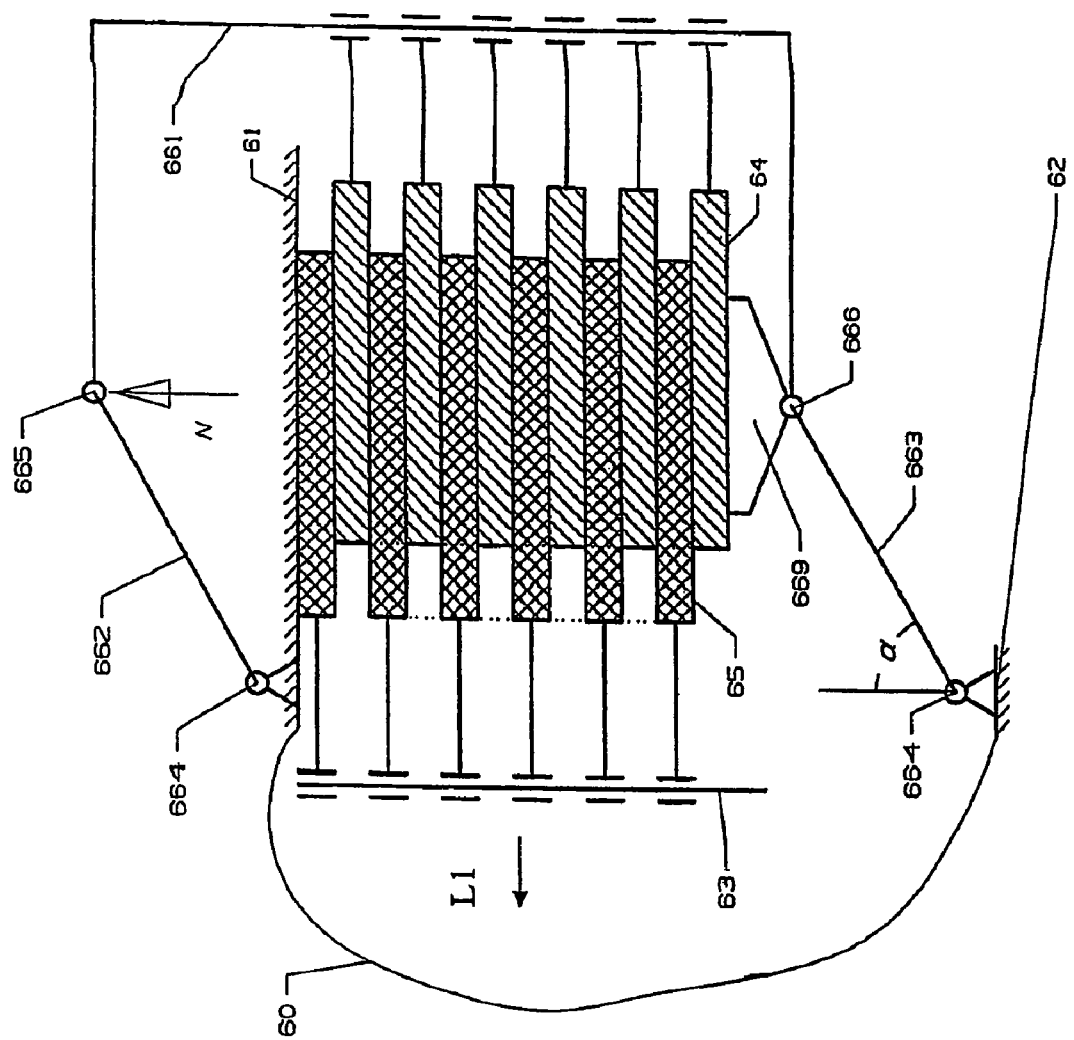
FIG. 9C is a block diagram showing operation principle of the one-way clutches of FIG. 9A.

With reference to FIGS. 9A and 9B, as another example of the preferable embodiments shown in FIGS. 2 through 5, the first one-way clutch 2 is a four-bar-linkage-mechanism-pressing one-way clutch which is engaged by pressing by a four-bar linkage mechanism. The four-bar-linkage-mechanism-pressing one-way clutch comprises a housing 60 composed of a clutch disc 61 and a clutch cover 62 both combined together. As shown in FIGS. 9A and 9B, in a preferable embodiment of the present invention, the clutch disc 61 and the clutch cover 62 are connected to each other by means of bolts. A clutch hub 63, a plurality of hub friction plates 65, at least one set of disc friction plates 64, and at least one four-bar linkage pressing mechanism 66 are disposed in the housing 60. As shown in FIGS. 9A and 9B, the clutch hub 63 is located at a center of the housing 60, a through hole 622 is formed in a center portion of the clutch cover 62, and an end (right end in FIGS. 9A and 9B) of the clutch hub 63 is exposed from the through hole 622 so as to be coupled with an outer input shaft or an output shaft. The hub friction plates 65 have a shape of a circular ring, and are fitted over the clutch hub 63 and coupled therewith in such a manner that a torque can be transmitted. In a preferable embodiment shown in FIGS. 9A and 9B, the clutch hub 63 and the hub friction plates 65 are coupled with each other by a spline. A transmitting shaft 612 is mounted at a center of the clutch disc 61, and has an end projecting outwards and coupled with an outer input or output shaft and the other end supported in a center hole of the clutch hub 63 through a bearing 67. The bearing 67 is a needle roller bearing. Therefore, the transmitting shaft not only is positioned with accuracy, but also can rotate agilely.

A number of sets of the least one set of disc friction plates 64 and a number of the at least one four-bar linkage pressing mechanisms 66 are the same. As shown in FIGS. 9A and 9B, in a preferable embodiment of the present invention, the at least one four-bar linkage pressing mechanism includes three four-bar linkage pressing mechanisms 66 disposed on the housing 60, the at least one set of disc friction plate includes three sets of disc friction plates 64 correspondingly disposed in the housing 60, the three four-bar linkage pressing mechanisms 66 and the three sets of friction plates 64 are arranged in equal intervals in a circumferential direction.

As shown in FIGS. 9A and 9B, each set of the at least one set of disc friction plates comprise a plurality of friction plates having a shape of a part of a circular ring which are arranged so as to be alternated with the hub friction plates 65. Each of the at least one four-bar linkage pressing mechanism 66 has a traverse bar 661, each set of the at least one set of disc friction plates 66 have a through hole 641 at a same position of respective disc friction plates, and the traverse bars 661 pass through the through holes 641. The four-bar linkage mechanisms 66 press the disc friction plates 64 and the hub friction plates 65 against a friction surface of the clutch disc 61. With reference to FIG. 9B, specifically, each of the at least one four-bar linkage pressing mechanism comprise two supporting arms 662 and 663 parallel to each other and the traverse bar 661 jointing the two supporting arms 662 and 663. The supporting arms 662 and 663 have a same length. The two supporting arms 662 and 663 have ends hinged, by means of jointing pins 664, to the housing 60, and specifically to the clutch disc 61 and the clutch cover 62, respectively, as shown in FIG. 9B, and the other ends hinged to jointing blocks 667 and 668 by means of jointing pins 665 and 666, respectively, and the traverse bar 661 has two ends which are fixed to the jointing blocks 667 and 668, respectively. The housing 60, the two supporting arms 662 and 663, and the traverse bar 661 constitute a four-bar linkage mechanism, of which opposite links are parallel to each other. A spring 660 is fitted over the end of the traverse bar 661 and a pressing block 669 is disposed at the other end of the traverse bar 661, and the pressing block 669 is hinged to the jointing pin 666.

As shown in FIG. 9B, the spring 660 is a compression spring. The compression spring 660 and the pressing block 669 act on two sides of each set of the at least one set of the disc friction plates 64, respectively. The compression spring 660 generates a pre-pressing force to press the disc friction plates 64 and the hub friction plates 65, so that the disc friction plates 64 and the hub friction plates 65 abut against each other.

As shown in FIGS. 9A and 9B, each set of the at least one set of the disc friction plates 64 are further provided with two through holes 642 and 643 through which two cylindrical pins 68 and 69 pass, respectively, so that the respective disc friction plates are connected together in series. The clutch disc 61 and the clutch cover 62 are correspondingly formed with two elongate grooves 611 and 621 extending in a circumferential direction thereof, respectively. Two ends of each of the two cylindrical pins 68 and 69 are inserted in the elongate grooves 611 and 621, each of the ends of the two cylindrical pins is provided with two planes parallel to each other, each of the elongate grooves is provided with two planes parallel to each other, and the two planes of each of the ends fit with the corresponding two planes of each of the elongate grooves. Therefore, each set of the at least one set of the disc friction plates 64 are supported to the clutch cover 61 and the clutch disc 62 by means of the cylinder pins 68 and 69, and the cylinder pins 68 and 69 bear centrifugal forces generated by the respective disc friction plates 64 when they rotate.

With reference to 9C, operation process and operation principle of four-bar linkage pressing mechanisms shown in FIGS. 9A and 9B are described as follows. When a moment is input from the clutch hub 63, the clutch hub 63 and the hub friction plates 65 constitute the driving part 21, and the disc friction plate 64, the housing 60 and the transmitting shaft 612 constitute the driven part 22. When the input moment drives the clutch hub 63 to rotate in the direction L1, the clutch hub 63 drives the hub friction plates 65 to rotate in the direction L1 through the spline. The hub friction plates 65 drive the disc friction plates 64 to rotate likewise in the direction L1 with frictional force therebetween. The hub friction plates 65 drive the housing 60 to rotate in the direction L1 through the four-bar linkage mechanisms 60. At that time, the supporting arms 663 and the pressing blocks 669 further press the hub friction plates 65 and the disc friction plates 64, so as to achieve self-locking. Otherwise, when the input moment drives the clutch hub 63 to rotate in a direction opposite to the direction L1, the four-bar linkage mechanisms 66 is automatically set to an unlocking state, the pressing force applied to the disc friction plates 64 and the hub friction plates 65 by the pressing blocks 669 decreases, so that the driving part 21 and the driven part 22 can rotate relative to each other. As a result, the clutch is in an overrunning state.

Figure 9D:
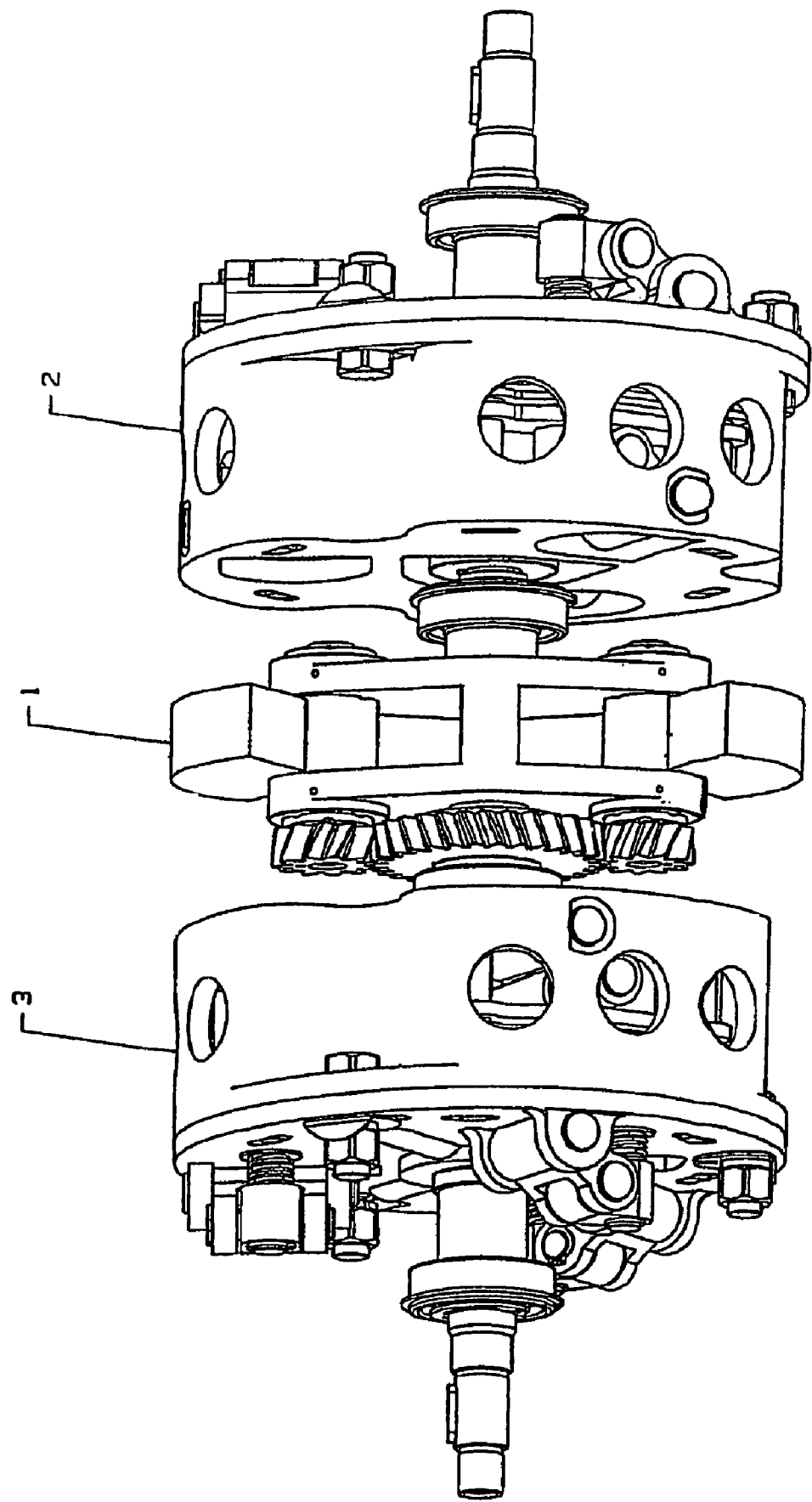
FIG. 9D is a view showing an entire mechanical configuration of a transmission of the present invention in the case where both the first and second one-way clutches adopt those shown in FIGS. 9A and 9B.

With reference to FIG. 9D, as a preferable embodiment of the present invention, the second one-way clutch 3 is also the above four-bar-linkage-mechanism-pressing one-way clutch, which is sensitive in response and excellent in wear resistance, and can transmit moment with a large power, so that it can be used in various heavy vehicles.

Figure 10A:
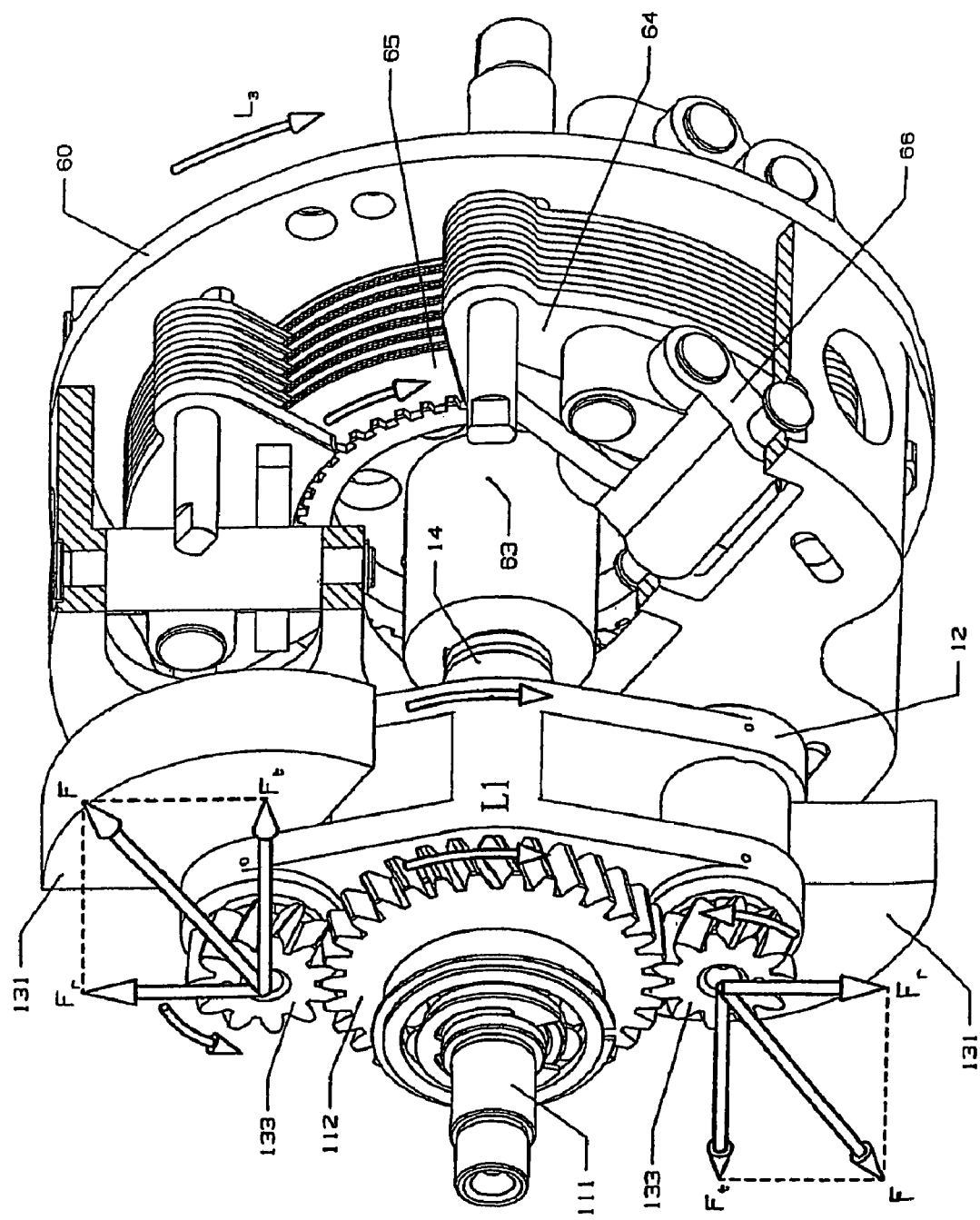
FIG. 10A is a schematic view showing an operating condition of the continuously variable transmission according to the present invention, in which the first one-way clutch is in a lockup state.
Figure 10B:
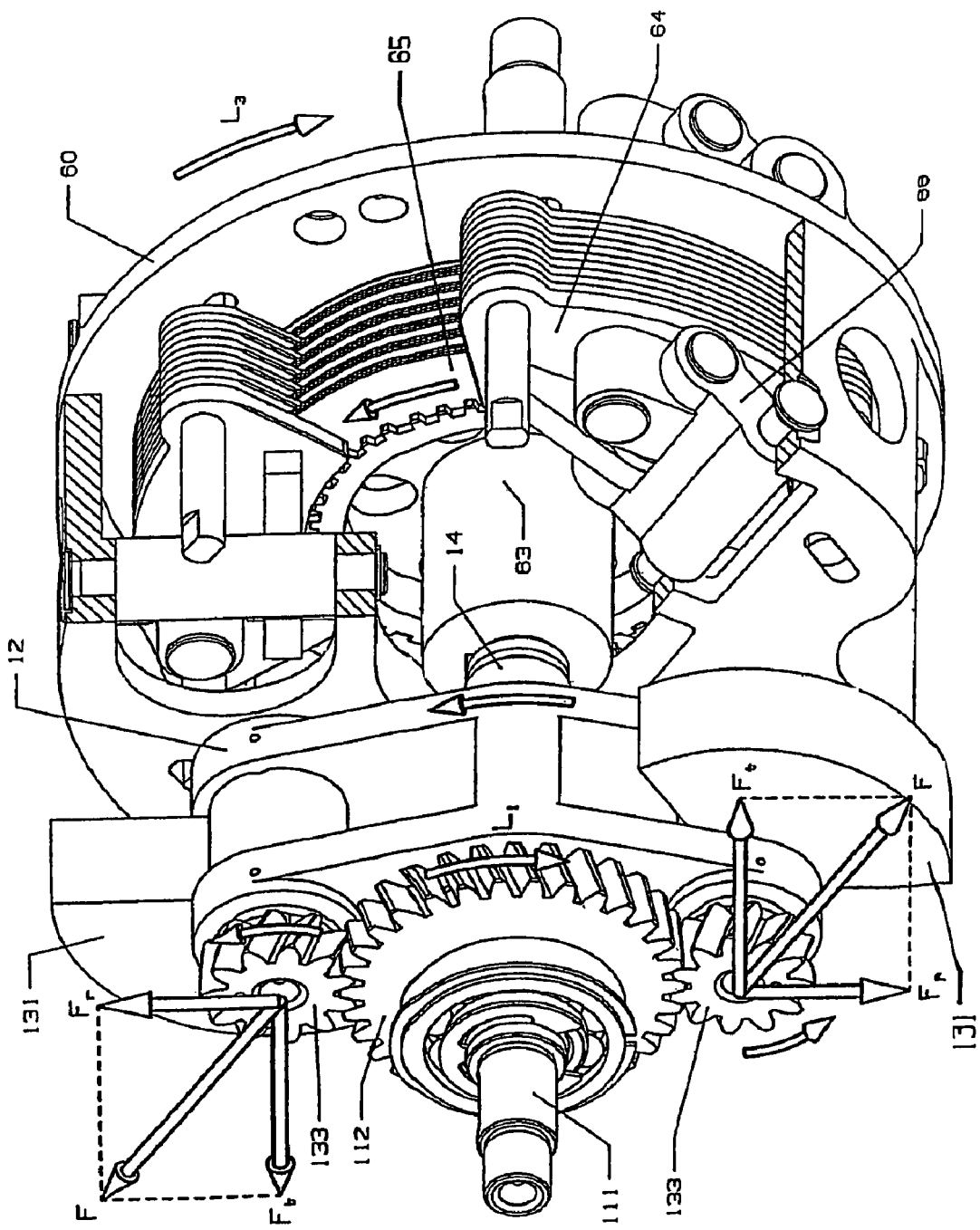
FIG. 10B is a schematic view showing another operating condition of the continuously variable transmission according to the present invention, in which the first one-way clutch is in an overrunning state.

Operation principle and operation process of the transmission of the present invention are described as follows. With reference to FIGS. 10A and 10B, a cutaway perspective view of a combination of a torque converting mechanism having two eccentric assemblies and a four-bar-linkage-mechanism-pressing one-way clutch.

Referring to FIGS. 10A and 10B, when an engine drives the driving shaft 111 to rotate in a clockwise direction (viewed from a left side, the following is the same as this), so long as there is a speed difference between the input part 11 and the carrier 12, the driving gear 112 drives the two driven-gears 133 to rotate in directions shown in FIGS. 10A and 10B, respectively. Therefore, the eccentric masses 131 rotate around the driven shafts 132 over an entire circumference. When the eccentric masses 131 rotate, centrifugal forces F are generated. Each of the forces F is directed in a direction from a center of the corresponding driven shaft 132 towards a center of mass of the corresponding the eccentric mass 131 as shown in FIGS. 10A and 10B. The forces F act on the carrier 12 through the driven shafts 132. Each of the forces F decomposes in a circumferential direction and a radial direction of rotation of the carrier 12 into a radial force Fr and a tangential force Ft. Since the two eccentric assemblies 13 is symmetric about the center of the carrier 12 at any moment, the two radial forces Fr are equal in magnitude to each other, are directed to opposite directions, respectively, and are located in a same line, so as to cancel out. The two tangential forces Ft are equal in magnitude to each other, are directed to opposite directions, respectively, and are parallel to each other with a distance therebetween (a distance d between axes of the two driven shafts), so as to constitute a moment of couple M. The moment of couple M drives the carrier 12 to rotate.

The centrifugal forces F generated by the eccentric masses 131 when they rotate have respective directions and respective magnitudes both periodically varying with rotation positions of the eccentric masses 131 relative to the carrier 12. Therefore, the moment of couple M has a direction and a magnitude which are both periodically varying. When the eccentric masses 131 rotate to the positions shown in FIG. 10A, the moment of couple M acts in the clockwise direction and the carrier 12 and the output shaft 14 rotate in the clockwise direction. As the eccentric masses 131 further rotate, the moment of couple M varies in direction. When the eccentric masses 131 rotate to the positions shown in FIG. 10B, the centrifugal forces F generated by the eccentric masses 131 are directed in directions shown in FIG. 10B, respectively. The tangential forces Ft decomposed from the forces F act in directions opposite to those shown in FIG. 10A, respectively. Therefore, a moment of couple M in a counter-clockwise direction is generated. The moment of couple M makes the carrier 12 rotate in the counter-clockwise direction or decreases a rotation speed of the carrier 12 in the clockwise direction. Therefore, every moment of an entire period of rotation of the eccentric masses 131 is considered theoretically, a moment M applied to the carrier 12 varies in magnitude in every moment, and is alternately changed in direction. The carrier 12 rotates in various motion states depending upon the rotation speed of the one-way clutch 12. In the case where the input part 11 rotates normally, the carrier 12 takes on discontinuous fluctuation when a rotation speed of the output part of the one-way clutch 2 is zero, the carrier 12 takes on back-and-forth swing when the output part of the one-way 2 has a certain rotation speed but the carrier 12 and components rotating therewith have moment of momentum smaller than amount of change of the moment of momentum of the eccentric masses 131, and the carrier 12 rotates continuously towards the lockup direction of the one-way clutch when the output part of the one-way 2 has a large rotation speed and the carrier 12 and the components rotating therewith have moment of momentum greater than amount of change of the moment of momentum of the eccentric masses 131. The rotation of the eccentric masses 131 makes the rotation of the carrier 12 periodically quicken and slow.

It can be found from the above analysis, the speed and moment outputted from the output shaft 14 which have undergone moment and speed changes by the torque converting mechanism 1 is fluctuated. The operation process is described in combination with the one-way clutch mounted at the rear end of the torque converting mechanism 1 as follows. With reference to FIG. 1A, when the moment of couple M acts in the clockwise direction, the carrier 12 and the output shaft 14 rotate in the clockwise direction, the output shaft 14 drives the clutch hub 63 and the hub friction plates 65 of the first one-way clutch 2 located at the rear end to rotate in the clockwise direction, and the first one-way clutch 2 is automatically set to a self-locking state. Therefore, the hub friction plates 65 drive the disc friction plates 64, the housing 60 and the transmitting shaft 612 to rotate in the clockwise direction, and a moment in the direction L1 shown in FIG. 10A is outputted. With reference to FIG. 10B, when the moment of couple M acts in the counter-clockwise direction, the carrier 12 rotates in the counter-clockwise direction or a speed of rotation of the carrier 12 in the clockwise direction slows down, and the first one-way clutch 2 is automatically set to a overrunning state, so that the torque is not transmitted, but a large rotation speed difference exists between the driving gear 112 and the carrier 12. Therefore, the driving gear 112 drives the eccentric assemblies 13 to rotate in a higher rotation speed $\omega$, and the eccentric assemblies 13 store more kinetic energy (according to $E=0.5J\omega^2$, where J represents moment of inertia of the eccentric assembly 13 with respect to its axis). When the direction of the moment of couple M is changed into the clockwise direction from the counter-clockwise direction, the moment of couple M in the clockwise direction becomes greater. That is, when the moment of couple M acts in the counter-clockwise direction, the eccentric masses 131 store energy, and when the moment of couple M acts in the clockwise direction, the eccentric masses 131 output energy through the carrier 12. Therefore, the output shaft 612 of the one-way clutch can continuously output outwards moment in the clockwise direction (a direction L3 shown in FIGS. 10A and 10B).

As described above, the carrier 12 is lower in rotation speed than the driving gear 112 so that a rotation speed difference exists between the driving gear 112 and the carrier 12 in operation. With the rotation speed difference, the speed and the moment outputted from the output shaft 14 and the transmitting shaft 612 of the one-way clutch can be automatically adjusted according to change of magnitude of the load from an outside part. Specific processes and principle of the adjustment are described as follows. When a vehicle runs upwards on an upwards inclined road, resistance to the output shaft 25 of the first one-way clutch increases and the rotation speed of the output shaft 25 of the first one-way clutch slows down. When the first one-way clutch 2 is in the lockup state, resistance to the output shaft 14 of the torque converting mechanism 1 also increases, and the rotation speed of the carrier 12 automatically lowers, so that the rotation speed difference between the driving gear 112 and the carrier 12 increases. As described above, at that time, the eccentric masses 131 rotate at a higher speed, and store more kinetic energy, so that greater moment of couple M can be outputted at a next period. When a load decreases, change of variables is just contrary to that of the above described operation condition, the output speed of the torque converting mechanism automatically increases, the output torque of the torque converting mechanism correspondingly decrease. Characteristic of this type complies with requirement of stepless speed change of a vehicle. Therefore, the vehicle can achieve stepless speed change.

As described above, in order to prevent the kinetic energy stored in the eccentric masses 131 from being transmitted back to the engine, in the embodiments shown in FIGS. 3 and 5, the second one-way clutch 3 is additionally mounted between the engine and the torque converting mechanism, and thus the energy from the engine can be transmitted only to the torque converting mechanism 1 in a single direction, so as to prevent kinetic energy of the eccentric assemblies 13 from being transmitted back to the engine to decrease the speed of the of the eccentric assemblies 13 and thus to affect magnitude of moment of couple M, as shown in detail in FIGS. 8D and 9D.

The above embodiments are illustrative. It would be appreciated by those skilled in the art that modifications and changes may be made in these embodiments without departing from the principles and spirit of the invention. For example, one or four sets of the eccentric assemblies 13 can be disposed on the carrier 12. All the equivalents fall within the scope of the present invention.

The invention claimed is:

1. A mechanically controlled continuously variable automatic transmission, comprising a housing and a torque converting mechanism mounted in the housing,
   the torque converting mechanism comprising an input part, a rotatable or rotary carrier, at least one eccentric assembly which is rotatably mounted on the carrier, and an output part, wherein the input part and the carrier can rotate independently with respect to each other, and have respective rotation axes which are collinear,
   characterized in that
   each of the at least one eccentric assembly comprises an eccentric mass which is driven to rotate around its rotation axis by the input part,
   the output part is provided with only one one-way clutch directly connected therewith, and the one-way clutch is defined as a first one-way clutch,
   the first one-way clutch is an axially pressing surface-contact one-way clutch with a driving part and a driven part arranged axially, wherein when the driving part and the driven part engage with each other, engagement surfaces of engagement elements of the driving part and the driven part abut against each other so as to transmit moment by means of frictional force therebetween.

2. The mechanically controlled continuously variable automatic transmission according to claim 1, characterized in that:
   the transmission further comprises a second one-way clutch located at a front end of the torque converting mechanism which has an input part coupled with a power source and an output part coupled with the input part of the torque converting mechanism.

3. The mechanically controlled continuously variable automatic transmission according to claim 2, characterized in that:
   the torque converting mechanism comprises the carrier, and the at least one eccentric assembly includes two eccentric assemblies symmetrically mounted at two ends of the carrier,
   each of the two eccentric assemblies comprises a driven shaft, and the eccentric mass and a driven gear both mounted on the driven shaft, and
   the eccentric masses and the driven gears are hinged to the ends of the carrier by means of the driven shafts.

4. The mechanically controlled continuously variable automatic transmission according to claim 3, characterized in that:

the input part of the torque converting mechanism comprises a driving shaft and a driving gear mounted on the driving shaft, the driving shaft is coupled with the power source or the second one-way clutch, and the driving gear is in mesh with the driven gears, and the output part is an output shaft fixed at a center of the carrier, and the driving part of the first one-way clutch is coupled with the output shaft.

5. The mechanically controlled continuously variable automatic transmission according to claim 4, characterized in that:

the first one-way clutch is a screw-pressing one-way clutch which is engaged by screw-pressing, the screw-pressing one-way clutch comprises a clutch drum and first and second clutch discs disposed in the clutch drum and parallel to each other, at least one drum friction plate and at least one spring, the first and second clutch discs clamp the at least one drum friction plate under action of the at least one spring, and the at least one drum friction plate is fitted over a sleeve and coupled with the clutch drum in such a manner that a torque can be transmitted, the sleeve has an inner thread, and a transmitting shaft projects into the sleeve and has an end projecting into the sleeve which is formed with an outer thread engagable with the inner thread.

6. The mechanically controlled continuously variable automatic transmission according to claim 5, characterized in that:

the at least one drum friction plate includes a plurality of drum friction plates, and a disc friction plate is interposed between every two adjacent drum friction plates, the disc friction plate is fitted over the sleeve and coupled with the sleeve in such a manner that a torque can be transmitted, the clutch drum, the first and second friction discs, the drum friction plates, the sleeve and the disc friction plate have respective rotation axes which are collinear, and the drum friction plates are splined to the clutch drum and the disc friction plate is also splined to the sleeve.

7. The mechanically controlled continuously variable automatic transmission according to claim 6, characterized in that:

the clutch drum has one open end and the other end formed with an outwards extending hollow shaft at a center portion of the other end, the first clutch disc is fixed on the transmitting shaft, and mounted at the open end of the clutch drum by means of a first snap ring, the second clutch disc is integrally formed with the sleeve, and mounted on the transmitting shaft by means of a second snap ring, only one spring is provided in the clutch drum, the one spring is a plate-like compression spring fitted over the transmitting shaft, and is disposed between the second snap ring and the second clutch disc, and the end, which projects into the sleeve, of the transmitting shaft is supported in the hollow shaft via a bearing.

8. The mechanically controlled continuously variable automatic transmission according to claim 4, characterized in that:

the first one-way clutch is a four-bar-linkage-mechanism-pressing one-way clutch which is engaged by pressing by a four-bar linkage mechanism, the four-bar-linkage-mechanism-pressing one-way clutch comprises a housing composed of a clutch disc and a clutch cover both combined or covered together, and a clutch hub, a plurality of hub friction plates, at least one set of disc friction plates, and at least one four-bar linkage pressing mechanism are disposed in the housing, a through hole is formed in a center portion of the clutch cover, and an end of the clutch hub is exposed from the through hole, the hub friction plates have a shape of a circular ring, and are fitted over the clutch hub and coupled therewith in such a manner that a torque can be transmitted, a number of sets of the least one set of disc friction plates and a number of the at least one four-bar linkage pressing mechanism are the same, and each set of the at least one set of disc friction plates comprise a plurality of friction plates having a shape of a part of a circular ring which are arranged so as to be alternated with the hub friction plates, each of the at least one four-bar linkage pressing mechanism has a traverse bar, each set of the at least one set of disc friction plates have a through hole at a same position of respective disc friction plates, and the traverse bars pass through the through holes, respectively, and the four-bar linkage mechanisms press the disc friction plates and the hub friction plates against a friction surface of the clutch disc.

9. The mechanically controlled continuously variable automatic transmission according to claim 8, characterized in that:

each of the at least one four-bar linkage pressing mechanism comprise two supporting arms parallel to each other and the traverse bar jointing the two supporting arms, the two supporting arms have ends hinged to the housing by means of jointing pins, respectively, and the other ends hinged to jointing blocks by means of jointing pins, respectively, and the traverse bar has two ends which are fixed to the jointing blocks, respectively, and a spring is fitted over the end of the traverse bar and a pressing block is disposed at the other end of the traverse bar, and the pressing block is hinged to the jointing pin.

10. The mechanically controlled continuously variable automatic transmission according to claim 9, characterized in that:

each set of the at least one set of the disc friction plates are further provided with two through holes through which two cylindrical pins pass, respectively, so that the respective disc friction plates are connected together in series, the clutch disc and the clutch cover are correspondingly formed with two elongate grooves extending in a circumferential direction, respectively, and two ends of each of the two cylindrical pins are inserted in the elongate grooves, each of the ends of the two cylindrical pins is provided with two planes parallel to each other, each of the elongate grooves is provided with two planes parallel to each other, and the two planes of each of the ends fit with the corresponding two planes of each of the elongate grooves.

11. The mechanically controlled continuously variable automatic transmission according to claim 10, characterized in that:

the hub friction plates are splined to the clutch hub, and a transmitting shaft is mounted at a center of the clutch disc, and has an end projecting outwards and the other end supported in a center hole of the clutch hub through a bearing.

12. The mechanically controlled continuously variable automatic transmission according to claim 11, characterized in that:

the at least one four-bar linkage pressing mechanism includes three four-bar linkage pressing mechanisms disposed on the housing, the at least one set of disc friction plate includes three sets of disc friction plates correspondingly disposed in the housing, the three four-bar linkage pressing mechanisms and the three sets of friction plates are arranged in equal intervals in a circumferential direction.

13. The mechanically controlled continuously variable automatic transmission according to claim 2, characterized in that:

the torque converting mechanism comprises the carrier, and the at least one eccentric assembly includes three eccentric assemblies arranged on the carrier at equal intervals in a circumferential direction thereof, each of the three eccentric assemblies comprises a driven shaft, and the eccentric mass and a driven gear both mounted on the driven shaft, and the carrier is a disc-like body, and the eccentric masses and the driven gears are hinged to an edge of the carrier by means of the driven shafts.

14. The mechanically controlled continuously variable automatic transmission according to claim 13, characterized in that:

the input part of the torque converting mechanism comprises a driving shaft and a driving gear mounted on the driving shaft, the driving shaft is coupled with the power source or the second one-way clutch, and the driving gear is in mesh with the driven gears, and the output part is an output shaft fixed at a center of the carrier, and the driving part of the first one-way clutch is coupled with the output shaft.

15. The mechanically controlled continuously variable automatic transmission according to claim 1, characterized in that:

the transmission further comprises a third one-way clutch disposed at a rear end of the first one-way clutch, and the third one-way clutch has a lockup direction opposite to that of the first one-way clutch and has a movable part coupled with an output part of the first one-way clutch and a stationary part fixed in the housing.

* * * * *

UNITED STATES PATENT AND TRADEMARK OFFICE
CERTIFICATE OF CORRECTION

| | | |
|---|---|---|
| PATENT NO. | : 7,985,156 B2 | Page 1 of 1 |
| APPLICATION NO. | : 11/666390 | |
| DATED | : July 26, 2011 | |
| INVENTOR(S) | : Wenming Han | |

It is certified that error appears in the above-identified patent and that said Letters Patent is hereby corrected as shown below:

Col. 17, Line 10
  Delete "FIG. 1A"
  Insert --FIG. 10A--

Signed and Sealed this
Twenty-third Day of October, 2012

David J. Kappos
*Director of the United States Patent and Trademark Office*